US011330488B2

(12) United States Patent
Hong

(10) Patent No.: US 11,330,488 B2
(45) Date of Patent: May 10, 2022

(54) MEASUREMENT REPORTING METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 26 days.

(21) Appl. No.: 16/636,334

(22) PCT Filed: Aug. 4, 2017

(86) PCT No.: PCT/CN2017/096020
§ 371 (c)(1),
(2) Date: Feb. 3, 2020

(87) PCT Pub. No.: WO2019/024088
PCT Pub. Date: Feb. 7, 2019

(65) Prior Publication Data
US 2020/0169928 A1 May 28, 2020

(51) Int. Cl.
*H04W 36/00* (2009.01)
*B64C 39/02* (2006.01)
(Continued)

(52) U.S. Cl.
CPC ....... *H04W 36/0094* (2013.01); *B64C 39/024* (2013.01); *H04W 36/00835* (2018.08);
(Continued)

(58) Field of Classification Search
CPC ....... H04W 36/0094; H04W 36/00837; H04W 36/00835; H04W 36/30; H04W 72/042; B64C 39/024; B64C 2201/122
See application file for complete search history.

(56) References Cited

U.S. PATENT DOCUMENTS 10,271,258 B2 *  4/2019  Van Der Velde ..... H04W 36/04
2005/0148368 A1 *  7/2005  Scheinert ..............  H04W 24/02
                                                    455/561

(Continued)

FOREIGN PATENT DOCUMENTS

CN    101848504 A       9/2010
CN    101848504 B    *  7/2012
(Continued)

OTHER PUBLICATIONS

ISA State Intellectual Property Office of the People's Republic of China, International Search Report dated Apr. 27, 2018 in Application No. PCT/CN2017/096020.
(Continued)

Primary Examiner — Khai M Nguyen
(74) Attorney, Agent, or Firm — Syncoda LLC; Feng Ma

(57) ABSTRACT

A measurement reporting method includes: in a first target signaling and a second target signaling, configuring a measurement parameter and a measurement reporting parameter, respectively, for an unmanned aerial vehicle (UAV) in a connection state; then sending the first target signaling and the second target signaling to the UAV, so that the UAV performs target measurement according to the first target signaling, and reporting, after obtaining the measurement parameter, the measurement report including the measurement reporting parameter to the base station according to the second target signaling. The base station can respectively configure a measurement parameter and a measurement reporting parameter for the UAV in a connection state, so that in the flight process, the UAV can normally perform target measurement and report the measurement report of the target measurement, ensuring the accuracy and timeliness of the target measurement and the reporting measurement report of the UAV.

19 Claims, 14 Drawing Sheets

(51) Int. Cl.
*H04W 36/30* (2009.01)
*H04W 72/04* (2009.01)

(52) U.S. Cl.
CPC ..... *H04W 36/00837* (2018.08); *H04W 36/30* (2013.01); *H04W 72/042* (2013.01); *B64C 2201/122* (2013.01)

(56) References Cited

U.S. PATENT DOCUMENTS

| | | | |
|---|---|---|---|
| 2008/0130585 A1* | 6/2008 | Park | H04W 36/00837 370/332 |
| 2013/0208601 A1* | 8/2013 | Cui | H04W 24/10 370/252 |
| 2019/0180633 A1* | 6/2019 | Yoshizawa | H04W 36/0088 |
| 2020/0053608 A1* | 2/2020 | Tao | H04W 36/0088 |
| 2021/0083730 A1* | 3/2021 | Hwang | H04B 7/0408 |
| 2021/0144607 A1* | 5/2021 | Hong | H04W 36/08 |
| 2021/0144611 A1* | 5/2021 | Wigard | H04W 36/00837 |

FOREIGN PATENT DOCUMENTS

| | | |
|---|---|---|
| CN | 104053197 A | 9/2014 |
| CN | 104219708 A | 12/2014 |
| CN | 105792275 A | 7/2016 |
| WO | 2016190793 A1 | 12/2016 |

OTHER PUBLICATIONS

Nokia, Alcatel-Lucent Shanghai Bell, "Potential Enhancements for Aerial Vehicles" 3GPP TSG RAN WG1 Meeting #89 R1-1707198 Hangzhou, P R. China, May 15-19, 2017.

Ericsson, "On potential enhancements for low altitude aerial vehicles" 3GPP TSG-AN WG1 #89 R1-1708294 Hangzhou, China, May 15-19, 2017.

1st Office Action (CNOA1) in CN 201780000822.1 dated Jun. 22, 2020.

Huawei, HiSilicon, "Discussion on increasing the minimum requirements for number of carriers" (R2-141363) 3GPP TSG RAN WG2 Meeting #85bis, Valencia, Spain, Mar. 31-Apr. 4, 2014.

* cited by examiner

MEASUREMENT REPORTING METHOD AND APPARATUS

CROSS-REFERENCE TO RELATED APPLICATION

This application is a national stage of International Application No. PCT/CN2017/096020 filed on Aug. 4, 2017, the disclosure of which is hereby incorporated by reference in its entirety.

TECHNICAL FIELD

The present disclosure relates to the field of communication technology, and in particular, to a measurement reporting method and apparatus.

BACKGROUND

With the rapid development of unmanned aerial vehicle technology, the reduction of costs and the improvement of functions, the application of unmanned aerial vehicle is becoming more common. For example, the current applications in aerial photography, agriculture, plant protection and other fields have greatly expanded the use of steerable devices themselves. Various countries are actively expanding industry applications and developing steerable device technologies.

After take-off, the unmanned aerial vehicle has fewer obstacles in the air, so the reference signal corresponding to the current cell of more cells can be detected when compared to the ground. In a cellular network, the PCI (Physical Cell Identifier) of many cells is multiplexed, so the unmanned aerial vehicle will cause a PCI collision between the reported cells after taking off. In addition, the number of cells included in the measurement report set in the related art is small, and therefore, there is a problem that the number of cells reported by the unmanned aerial vehicle measurement is small.

SUMMARY

In order to overcome the problems in the related art, the embodiments of the present disclosure provide a measurement reporting method and apparatus.

According to a first aspect of the embodiment of the present disclosure, a measurement reporting method is provided, the method is applied to a base station, and the method includes:

configuring measurement parameters and measurement reporting parameters for an unmanned aerial vehicle in a connection state in a first target signaling and a second target signaling; where the measurement parameters are parameters that the unmanned aerial vehicle needs to measure when performing a target measurement, and the target measurement is a measurement of a cell handover according to channel quality corresponding to multiple target cells, the multiple target cells include: a serving cell in which the unmanned aerial vehicle is currently located and at least one cell adjacent to the serving cell; the measurement reporting parameters are parameters respectively corresponding to the multiple target cells and included in a measurement report of a target measurement reported by the unmanned aerial vehicle;

sending the first target signaling and the second target signaling to the unmanned aerial vehicle, so that the unmanned aerial vehicle performs the target measurement according to the first target signaling; after obtaining the measurement parameters, reporting the measurement report including the measurement reporting parameters to the base station according to the second target signaling.

Optionally, the first target signaling is triggerQuantity signaling and the second target signaling is reportQuantity signaling.

Optionally, the measurement parameters includes at least one of the following:

a reference signal received power RSRP, configured to characterize a downlink channel quality of a current cell;

a reference signal received quality RSRQ, configured to characterize the downlink channel quality of a current cell.

Optionally, in a case that the measurement parameters include RSRP or RSRQ, the measurement reporting parameters are consistent with the measurement parameters;

in a case that the measurement parameters include RSRP and RSRQ, the measurement reporting parameters include at least one of RSRP and RSRQ.

Optionally, the method further includes:

configuring, a smoothing coefficient corresponding to the measurement parameters for the unmanned aerial vehicle in a third target signaling; the smoothing coefficient is a coefficient for smoothing filtering current measurement parameters;

sending the third target signaling to the unmanned aerial vehicle, so that the unmanned aerial vehicle performs smoothing filtering on the measured measurement parameters according to the smoothing coefficient, and discarding the measurement parameters that reach a preset threshold according to a smoothing filtering result.

Optionally, the third target signaling is QuantityConfigEUTRA signaling.

Optionally, the method further includes:

configuring a number of target cells for the unmanned aerial vehicle in a fourth target signaling; the number of target cells is the maximum value of the total number of the multiple target cells;

sending the fourth target signaling to the unmanned aerial vehicle, so that the measurement report reported by the unmanned aerial vehicle includes the measurement reporting parameters respectively corresponding to cells of target number, the target number does not exceed the number of the target cells.

Optionally, the fourth target signaling is maxCellReport signaling.

According to a second aspect of the embodiment of the present disclosure, a measurement reporting method is provided, the method is applied to an unmanned aerial vehicle, and the method includes:

receiving a first target signaling and a second target signaling sent by a base station when in the connection state; where the first target signaling is a signaling for configuring measurement parameters for the unmanned aerial vehicle, the measurement parameters are parameters that the unmanned aerial vehicle needs to measure when performing a target measurement, the target measurement is a measurement of a cell handover according to a channel quality corresponding to multiple target cells, the multiple target cells include: a serving cell in which the unmanned aerial vehicle is currently located and at least one cell adjacent to the serving cell; the second target signaling is a signaling for configuring the measurement reporting parameters for the unmanned aerial vehicle, the measurement reporting parameters are parameters respectively corresponding to the multiple target cells and included in the measurement report of the target measurement reported by the unmanned aerial vehicle;

performing the target measurement according to the first target signaling to obtain the measurement parameters;

reporting the measurement report including the measurement reporting parameters to the base station according to the second target signaling.

Optionally, the first target signaling is triggerQuantity signaling and the second target signaling is reportQuantity signaling.

Optionally, the measurement parameters includes at least one of the following:

a reference signal received power RSRP, configured to characterize a downlink channel quality of a current cell;

a reference signal received quality RSRQ, configured to characterize the downlink channel quality of the current cell.

Optionally, in a case that the measurement parameters include RSRP or RSRQ, the measurement reporting parameters are consistent with the measurement parameters;

in a case that the measurement parameters include RSRP and RSRQ, the measurement reporting parameters include at least one of RSRP and RSRQ.

Optionally, the method further includes:

receiving a third target signaling sent by the base station, the third target signaling is signaling for configuring a smoothing coefficient corresponding to the measurement parameters for the unmanned aerial vehicle, the smoothing coefficient is a coefficient for smoothing filtering the current measurement parameter;

smoothing filtering the measured measurement parameters according to the smoothing coefficient to obtain a smoothing filtering result;

discarding the measurement parameters that reach a preset threshold according to the smoothing filtering result.

Optionally, the smoothing filtering the measured measurement parameters according to the smoothing coefficient to obtain a smoothing filtering result includes:

calculating the smoothing coefficient and the measurement parameter according to a predefined smoothing filtering formula, and using the calculation result as a smoothing filtering result.

Optionally, the third target signaling is QuantityConfigEUTRA signaling.

Optionally, the method further includes:

receiving a fourth target signaling sent by the base station, the fourth target signaling is signaling for configuring a number of target cells for the unmanned aerial vehicle, and the number of target cells is a maximum value of a total number of the multiple target cells;

the reporting a measurement report including the measurement reporting parameters to the base station includes:

in a case that the measurement parameters include RSRP or RSRQ, selecting a target number of the measurement parameters in the measurement parameters in descending order as the measurement reporting parameters, the target number does not exceed the number of target cells.

in a case that the measurement parameters include RSRP and RSRQ, selecting a target number of the measurement parameters in descending order as the measurement reporting parameters in at least one of RSRP and RSRQ;

reporting a measurement report including the selected measurement reporting parameters to the base station.

Optionally, the fourth target signaling is maxCellReport signaling.

According to a third aspect of the embodiment of the present disclosure, a measurement reporting apparatus is provided, the apparatus is applied to a base station, and the apparatus includes:

a first parameter configuration module, configured to configure measurement parameters and measurement reporting parameters for an unmanned aerial vehicle in the connection state in a first target signaling and a second target signaling; where the measurement parameters are parameters that the unmanned aerial vehicle needs to measure when performing a target measurement, and the target measurement is a measurement of a cell handover according to channel quality corresponding to multiple target cells, the multiple target cells include: in which the unmanned aerial vehicle is currently located and at least one cell adjacent to the serving cell; the measurement reporting parameters are parameters respectively corresponding to the multiple target cells and included in the measurement report of the target measurement reported by the unmanned aerial vehicle;

a first sending module, configured to transmit the first target signaling and the second target signaling to the unmanned aerial vehicle, so that the unmanned aerial vehicle performs the target measurement according to the first target signaling; after the measurement parameters are obtained, report the measurement report including the measurement reporting parameter to the base station according to the second target signaling.

Optionally, the first target signaling is triggerQuantity signaling and the second target signaling is reportQuantity signaling.

Optionally, the measurement parameters includes at least one of the following:

a reference signal received power RSRP, configured to characterize a downlink channel quality of a current cell;

a reference signal received quality RSRQ, configured to characterize the downlink channel quality of the current cell.

Optionally, in a case that the measurement parameters include RSRP or RSRQ, the measurement reporting parameters are consistent with the measurement parameters;

in a case that the measurement parameters include RSRP and RSRQ, the measurement reporting parameters include at least one of RSRP and RSRQ.

Optionally, the apparatus further includes:

a second parameter configuration module, configured to configure a smoothing coefficient corresponding to the measurement parameters for the unmanned aerial vehicle in a third target signaling; the smoothing coefficient is a coefficient for smoothing filtering the current measurement parameters;

a second sending module, configured to send the third target signaling to the unmanned aerial vehicle, so that the unmanned aerial vehicle performs smoothing filtering on the measured measurement parameters according to the smoothing coefficient, and discards the measurement parameters that reach a preset threshold according to a smoothing filtering result.

Optionally, the third target signaling is QuantityConfigEUTRA signaling.

Optionally, the apparatus further includes:

a third parameter configuration module, configured to configure a number of target cells for the unmanned aerial vehicle in a fourth target signaling; the number of target cells is a maximum value of the total number of the multiple target cells;

a third transmitting configuration module, configured to send the fourth target signaling to the unmanned aerial vehicle, so that the measurement report reported by the unmanned aerial vehicle includes the measurement reporting parameters respectively corresponding to the cells of target number, the number of targets does not exceed the number of target cells.

Optionally, the fourth target signaling is maxCellReport signaling.

According to a fourth aspect of the embodiment of the present disclosure, a measurement reporting apparatus is provided, the apparatus is applied to a unmanned aerial vehicle, and the apparatus includes:

a first receiving module, configured to receive a first target signaling and a second target signaling sent by a base station when in the connection state; where the first target signaling is a signaling for configuring measurement parameters for the unmanned aerial vehicle, the measurement parameters are parameters that the unmanned aerial vehicle needs to measure when performing a target measurement, the target measurement is a measurement of a cell handover according to a channel quality corresponding to multiple target cells, the multiple target cells include: a serving cell in which the unmanned aerial vehicle is currently located and at least one cell adjacent to the serving cell; the second target signaling is a signaling for configuring the measurement reporting parameters for the unmanned aerial vehicle, the measurement reporting parameters are parameters respectively corresponding to the multiple target cells and included in the measurement report of the target measurement reported by the unmanned aerial vehicle;

a measuring module, configured to perform the target measurement according to the first target signaling to obtain the measurement parameters;

a reporting module, configured to report the measurement report including the measurement reporting parameters to the base station according to the second target signaling.

Optionally, the first target signaling is triggerQuantity signaling and the second target signaling is reportQuantity signaling.

Optionally, the measurement parameters includes at least one of the following:

a reference signal received power RSRP, configured to characterize a downlink channel quality of a current cell;

a reference signal reception quality RSRQ, configured to characterize the downlink channel quality of the current cell.

Optionally, in a case that the measurement parameters include RSRP or RSRQ, the measurement reporting parameters are consistent with the measurement parameters;

in a case that the measurement parameters include RSRP and RSRQ, the measurement reporting parameters include at least one of RSRP and RSRQ.

Optionally, the apparatus further includes:

a second receiving module, configured to receive a third target signaling sent by the base station, the third target signaling is a signaling for configuring a smoothing coefficient corresponding to the measurement parameters for the unmanned aerial vehicle, the smoothing coefficient is a coefficient for smoothing filtering the current measurement parameter;

a smoothing filtering module, configured to smooth and filter the measured measurement parameters according to the smoothing coefficient to obtain a smoothing filtering result;

an execution module, configured to discard the measurement parameters that reach a preset threshold according to the smoothing filtering result.

Optionally, the smoothing filtering module includes:

a smoothing filtering sub-module, configured to calculate the smoothing coefficient and the measurement parameters according to a predefined smoothing filter formula, and use a calculation result as a smoothing filtering result.

Optionally, the third target signaling is QuantityConfigEUTRA signaling.

Optionally, the apparatus further includes:

a third receiving module, configured to receive a fourth target signaling sent by the base station, the fourth target signaling is a signaling for configuring a number of target cells for the unmanned aerial vehicle, and the number of target cells is a maximum value of a total number of the multiple target cells;

the reporting module includes:

a first selecting sub-module, configured to select a target number of the measurement parameters in the measurement parameters in descending order as the measurement reporting parameters in a case that the measurement parameters include RSRP or RSRQ, the target number does not exceed the number of target cells;

a second selecting sub-module, configured to select a target number of the measurement parameters from at least one of RSRP and RSRQ respectively in descending order as the measurement reporting parameters in a case that the measurement parameters include RSRP and RSRQ;

A reporting sub-module, configured to report a measurement report including the selected measurement reporting parameters to the base station.

Optionally, the fourth target signaling is maxCellReport signaling.

According to a fifth aspect of the embodiment of the present disclosure, a computer readable storage medium is provided, the storage medium stores a computer program for performing the measurement reporting method of the first aspect.

According to a sixth aspect of the embodiment of the present disclosure, a computer readable storage medium is provided, the storage medium stores a computer program for performing the measurement reporting method of the second aspect.

According to a seventh aspect of the embodiment of the present disclosure, a measurement reporting apparatus is provided, the apparatus is applied to a base station, and the apparatus includes:

a processor;

a memory, configured to store instructions executable by the processor;

where the processor is configured to:

configure measurement parameters and measurement reporting parameters for an unmanned aerial vehicle in a connection state in a first target signaling and a second target signaling; where the measurement parameters are parameters that the unmanned aerial vehicle needs to measure when performing a target measurement, and the target measurement is a measurement of a cell handover according to channel quality corresponding to multiple target cells, the multiple target cells include: a serving cell in which the unmanned aerial vehicle is currently located and at least one cell adjacent to the serving cell; the measurement reporting parameters are parameters respectively corresponding to the multiple target cells and included in the measurement report of the target measurement reported by the unmanned aerial vehicle;

send the first target signaling and the second target signaling to the unmanned aerial vehicle, so that the unmanned aerial vehicle performs the target measurement according to the first target signaling; after the measurement parameters are obtained, report the measurement report including the measurement reporting parameters to the base station according to the second target signaling.

According to an eighth aspect of the embodiment of the present disclosure, a measurement reporting apparatus is provided, the apparatus is applied to an unmanned aerial vehicle, and the apparatus includes:

a processor;

a memory, configured to store instructions executable by the processor;

where the processor is configured to:

receive a first target signaling and a second target signaling sent by a base station when in the connection state; where the first target signaling is a signaling for configuring measurement parameters for the unmanned aerial vehicle, the measurement parameters are parameters that the unmanned aerial vehicle needs to measure when performing a target measurement, the target measurement is a measurement of a cell handover according to channel quality corresponding to multiple target cells, the multiple target cells include: a serving cell in which the unmanned aerial vehicle is currently located and at least one cell adjacent to the serving cell; the second target signaling is a signaling for configuring the measurement reporting parameters for the unmanned aerial vehicle, the measurement reporting parameters are parameters respectively corresponding to the multiple target cells and included in the measurement report of the target measurement reported by the unmanned aerial vehicle;

perform the target measurement according to the first target signaling to obtain the measurement parameters;

report the measurement report including the measurement reporting parameters to the base station according to the second target signaling.

The technical solutions provided by the embodiments of the present disclosure may include the following beneficial effects:

In the embodiments of the present disclosure, in the first target signaling and the second target signaling, the base station can configure the measurement parameters and the measurement reporting parameters for the unmanned aerial vehicle in the connection state, respectively. Further, the base station transmits the first target signaling and the second target signaling to the unmanned aerial vehicle, the unmanned aerial vehicle perform target measurement according to the measure parameters; after the measurement parameters are obtained, the measurement report including the measurement report parameters is reported to the base station according to the second target signaling. Through the above described process, the base station can respectively configure the measurement parameters and the measurement reporting parameters for the unmanned aerial vehicle in the connection state, such that the unmanned aerial vehicle can perform the target measurement and report the measurement report of the target measurement normally during the flight process, and it also ensures the accuracy and timeliness of the target measurement and reporting measurement report of the unmanned aerial vehicle.

In the embodiments of the present disclosure, optionally, the first target signaling may be a triggerQuantity signaling, and the second target signaling may be reportQuantity signaling. The availability is high.

In the embodiments of the present disclosure, the measurement parameters may include at least one of a reference signal received power RSRP for characterizing a downlink channel quality of the current cell and a reference signal received quality RSRQ for characterizing a downlink channel quality of the current cell. Correspondingly, in a case that the measurement parameters include RSRP or RSRQ, the measurement reporting parameters may be consistent with the measurement parameters; in a case that the measurement parameters include RSRP and RSRQ, the measurement reporting parameters include at least one of RSRP and RSRQ. In the embodiments of the present disclosure, characterizing the downlink channel quality of the current cell by at least one of RSRP and RSRQ, thereby the corresponding measurement reporting parameters are determined according to the measurement parameters, so that the unmanned aerial vehicle can accurately and timely perform the target measurement and report the measurement report during the flight process.

In the embodiments of the present disclosure, the base station may further configure a smoothing coefficient corresponding to the measurement parameters for the unmanned aerial vehicle in the third target signaling, and then send the third target signaling to the unmanned aerial vehicle. The unmanned aerial vehicle performs smoothing filtering according to the smoothing coefficient, and discards the measurement parameters that reach the preset threshold according to the smoothing filtering result. Optionally, the third target signaling is QuantityConfigEUTRA signaling. It has a high availability. Through the above described process, the base station can configure the smoothing coefficient for the unmanned aerial vehicle, thereby filtering out the burst signal in the measured measurement parameters, so that the target measurement is more accurate.

In the embodiments of the present disclosure, the base station may further configure the number of the target cells for the unmanned aerial vehicle in the fourth target signaling. The number of the target cells is the maximum value of the total number of the multiple target cells. Further, the base station sends the fourth target signaling to the unmanned aerial vehicle, and the measurement report reported by the unmanned aerial vehicle includes measurement reporting parameters corresponding to the cells of target number respectively. The target number does not exceed the number of target cells. Optionally, the fourthly target signaling may be maxCellReport signaling which has a high availability. Through the above described process, the base station can configure number of the target cells for the unmanned aerial vehicle in the fourth target signaling, so that the number of cells included in the measurement report reported by the unmanned aerial vehicle is more. Thereby, the problem that the number of cells reported in the measurement report in the related art is small is solved.

In the embodiments of the present disclosure, when the unmanned aerial vehicle is in the connection state, it can receive the first target signaling and the second target signaling sent by the base station. The base station configures the measurement parameters and the measurement reporting parameters for the unmanned aerial vehicle in the first target signaling and the second target signaling, respectively. The unmanned aerial vehicle can perform the target measurement according to the first target signaling to obtain the measurement parameters. Further, after the target measurement is completed, the measurement report including the measurement reporting parameters is reported to the base station according to the second target signaling. Through the above described process, the target unmanned aerial vehicle can normally perform the target measurement and report the measurement report during the flight process, which ensures the accuracy and timeliness of the target measurement and reporting measurement report of the unmanned aerial vehicle.

In the embodiments of the present disclosure, when the unmanned aerial vehicle performs smoothing filtering on the measurement parameters according to the smoothing coefficient to obtain a smoothing filtering result, the smoothing coefficient and the measurement parameters are calculated according to a predefined smoothing filter formula, and the calculation result is used as a smoothing filtering result. Thereby, the measurement parameters reaching the preset threshold are discarded. The burst signal is filtered out in the measured measurement parameters, which makes the target measurement more accurate.

In the embodiments of the present disclosure embodiment, the unmanned aerial vehicle can select a target number of measurement parameters in descending order as the measurement reporting parameters. In the embodiment, the target number does not exceed the number of target cells configured by the base station for the unmanned aerial vehicle in the fourth target signaling. Further, the unmanned aerial vehicle reports a measurement report including the selected measurement reporting parameters to the base station. In the above described embodiment, the unmanned aerial vehicle reports the measurement report according to the number of target cells configured by the base station, so that the number of cells included in the measurement report reported by the unmanned aerial vehicle is more. The problem that the number of cells reported in the measurement report in the related art is small is solved.

It should be understood that the above general description and the following detailed description are exemplary and explanatory, and should not limit the present disclosure.

BRIEF DESCRIPTION OF THE DRAWINGS

The accompanying drawings herein are incorporated into the specification and form a part of the present specification. The embodiments conforming to the present disclosure are shown and used to explain the principles of the present disclosure in conjunction with the specification.

DETAILED DESCRIPTION

Exemplary embodiments will be described in detail here, examples of which are illustrated in the accompanying drawings. When the following description refers to the accompanying drawings, unless there is otherwise indicating, the same numbers in different accompanying drawings indicate the same or similar elements. The embodiments described in the following exemplary embodiments do not represent all embodiments consistent with the present disclosure. Instead, they are merely examples of apparatuses and methods consistent with aspects of the disclosure and as detailed in the appended claims.

The term used in the present disclosure is for the purpose of describing particular embodiments, and is not intended to limit the disclosure. The singular forms "one," "the" and "this" used in the present disclosure and the appended claims are also intended to include the majority forms, unless the context clearly indicates other meanings. It should also be understood that the term "and/or" as used herein refers to and includes any or all possible combinations of one or more of the associated and listed items.

It should be understood that although the terms first, second, third and etc.

may be used to describe various information in present disclosure, such information should not be limited to these terms. These terms are only used to distinguish the information of the same type from each other. For example, the first information may also be referred to as the second information without departing from the scope of the present disclosure. Similarly, the second information may also be referred to as the first information. Depending on the context, the word "in a case that" as used herein may be interpreted as "when," "while" or "in response to a determination".

Figure 1:
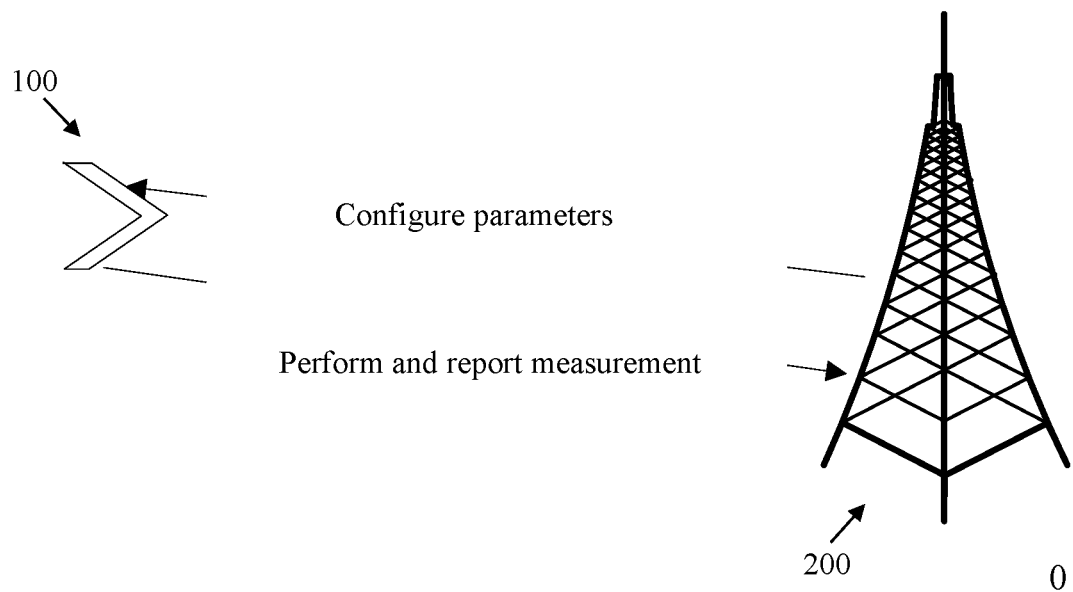
FIG. 1 is a schematic diagram of a measurement reporting scenario according to an exemplary embodiment.

As shown in FIG. 1, the embodiment of the present disclosure provides a scenario schematic diagram of measuring and reporting. In the first target signaling and the second target signaling, the base station 100 can respectively configure the measurement parameters and the measurement reporting parameters for the unmanned aerial vehicle (unmanned aerial vehicle) 200 in a connection state. After the base station 100 transmits the first target signaling and the second target signaling to the unmanned aerial vehicle 200, the unmanned aerial vehicle 200 can perform target measurement according to the first target signaling; after the measurement parameters are obtained, the measurement report including the measurement reporting parameter is reported to the base station 100 according to the second target signaling.

The measurement reporting method provided by the embodiment of the present disclosure is first introduced from the base station side.

Figure 2:
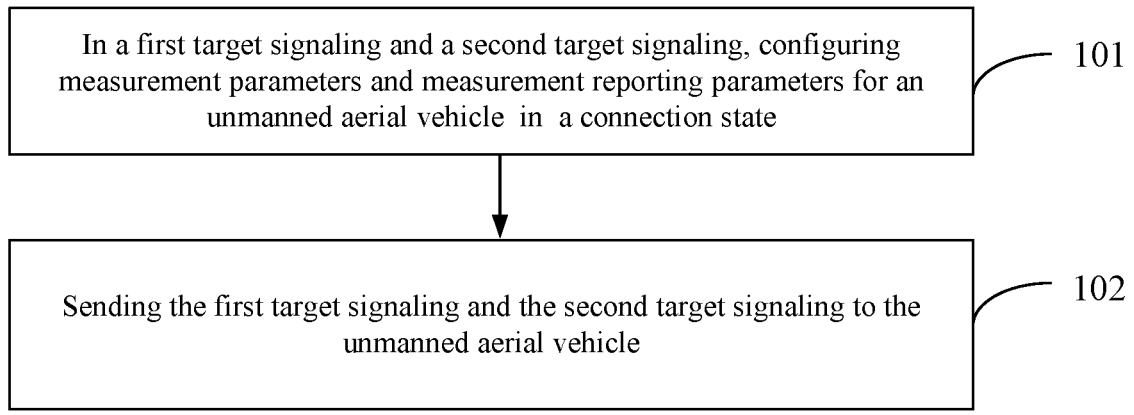
FIG. 2 is a flowchart of a measurement reporting method according to an exemplary embodiment.

Referring to FIG. 2, FIG. 2 is a flowchart showing a measurement reporting method, which may be applied to a base station, according to an exemplary embodiment, and includes the following steps:

In step 101, in a first target signaling and a second target signaling, configuring the measurement parameters and the measurement reporting parameters for an unmanned aerial vehicle unmanned aerial vehicle 200 in a connection state, respectively. In the embodiment, the measurement parameters are parameters that the unmanned aerial vehicle needs to measure when performing the target measurement, and the target measurement is a measurement of the cell handover according to the channel quality corresponding to the multiple target cells, the multiple target cells include: a serving cell in which the unmanned aerial vehicle is currently located and at least one cell adjacent to the serving cell; the measurement reporting parameters are parameters respectively corresponding to the multiple target cells and included in the measurement report of the target measurement reported by the unmanned aerial vehicle.

In step 102, sending the first target signaling and the second target signaling to the unmanned aerial vehicle, so that the unmanned aerial vehicle performs target measurement according to the first target signaling; after obtaining the measurement parameters, reporting the measurement report including the measurement reporting parameter to the base station according to the second target signaling.

In above described embodiment, in the first target signaling and the second target signaling, the base station can respectively configure the measurement parameters and the measurement reporting parameter for the unmanned aerial vehicle in the connection state. Further, the base station sends the first target signaling and the second target signaling to the unmanned aerial vehicle, the unmanned aerial vehicle performs target measurement according to the measurement parameters; after the measurement parameters are obtained, the measurement report including the measurement reporting parameters is reported to the base station according to the second target signaling. Through the above described process, the base station can respectively configure the measurement parameters and the measurement reporting parameters for the unmanned aerial vehicle in the connection state, so that the unmanned aerial vehicle can normally perform the target measurement and report the measurement report of the target measurement during the flight process, and ensures the accuracy and timeliness of the target measurement and reporting measurement report of the unmanned aerial vehicle.

For the above described step 101, optionally, the first target signaling may be a triggerQuantity signaling, and the second target signaling is a reportQuantity signaling, which have high availability.

In the related art, the triggerQuantity signaling can be used to define related parameters that need to be measured when the terminal performs target measurement; in the embodiment of the present disclosure, the base station may configure measurement parameters corresponding to the unmanned aerial vehicle in the triggerQuantity signaling, thereby triggering the unmanned aerial vehicle to perform the target measurement.

In the embodiment, the target measurement is a measurement of cell handover according to channel quality corresponding to multiple target cells, the multiple target cells include a serving cell in which the unmanned aerial vehicle is currently located and at least one cell adjacent to the serving cell. Ensuring the unmanned aerial vehicle can perform target measurement normally during flight process.

Optionally, the measurement parameters configured by the base station for the unmanned aerial vehicle may include at least one of the following: a reference signal received power RSRP for characterizing a downlink channel quality of the current cell; a reference signal received quality RSRQ for characterizing the downlink channel quality of the current cell.

The base station configures dedicated measurement parameters for the unmanned aerial vehicle in the triggerQuantity signaling, so that the unmanned aerial vehicle can perform the target measurement during the flight process, that is, measure at least one of the RSRP and the RSRQ sent by the base stations of the multiple target cells.

In addition, in the related art, reportQuantity signaling may be used to define related parameters included in a measurement report that a terminal reports target measurement, in the embodiment of the present disclosure, the base station may also configure dedicated measurement reporting parameters for the unmanned aerial vehicle in the reportQuantity signaling, so that the unmanned aerial vehicle can normally report the measurement report including the measurement reporting parameters after the target measurement is completed.

In an embodiment, in a case that the measurement parameters configured by the base station for the unmanned aerial vehicle are RSRP, the measurement reporting parameters configured for the unmanned aerial vehicle should also be RSRP; similarly, in a case that the measurement parameters configured by the base station for the unmanned aerial vehicle is RSRQ, the measurement reporting parameters configured for the unmanned aerial vehicle should also be RSRQ. That is, in a case that the measurement parameters include RSRP or RSRQ, the measurement reporting parameters may be consistent with the measurement parameters.

In a case that the measurement parameters configured by the base station for the unmanned aerial vehicle include both RSRP and RSRQ at the same time, the measurement reporting parameters may be consistent with the measurement parameters, or may be RSRP or RSRQ.

In above described embodiment, in the triggerQuantity signaling and the reportQuantity signaling, the base station can configure dedicated measurement parameters and measurement reporting parameters for the unmanned aerial vehicle, which have high availability. Further, characterizing the downlink channel quality of the current cell by at least one of RSRP and RSRQ, thereby the corresponding measurement reporting parameters are determined according to the measurement parameters, so that the unmanned aerial vehicle can accurately and timely perform the target measurement and report the measurement report during the flight process.

For the above described step 102, the signaling content corresponding to the above described first target signaling and the second target signaling may be sent by the base station to the unmanned aerial vehicle according to the related technology through using a RRC (Radio Resource Control) connection reconfiguration message.

In the above described embodiment, the base station can respectively configure the measurement parameters and the measurement reporting parameters for the unmanned aerial vehicle in the connection state, so that the unmanned aerial vehicle can normally perform the target measurement and report the measurement report of the target measurement during the flight process, ensuring the accuracy and timeliness of the target measurement and reporting measurement report of the unmanned aerial vehicle.

Figure 3:
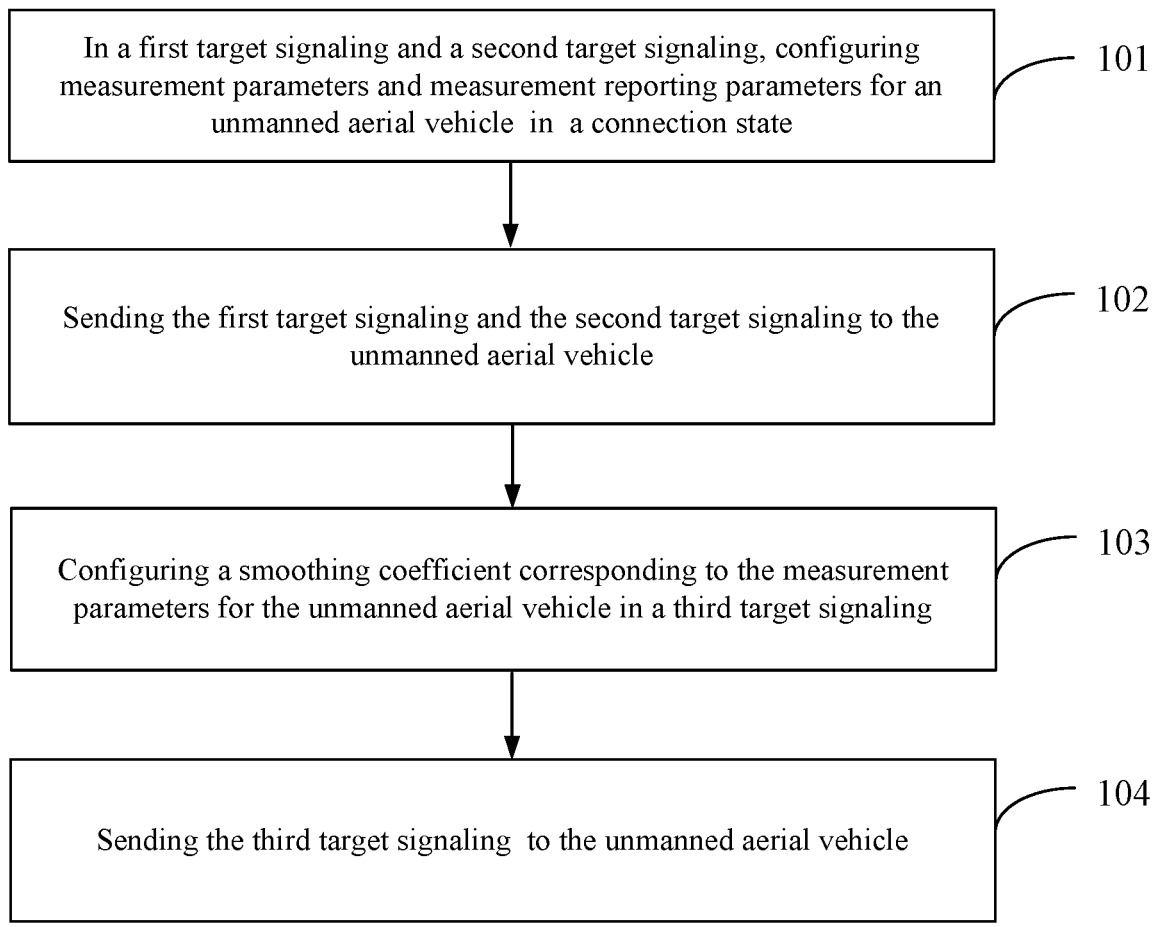
FIG. 3 is flowchart of another measurement reporting method according to an exemplary embodiment.

In an embodiment, in order to filter out the burst signal, referring to FIG. 3, FIG. 3 is a flowchart of another measurement reporting method according to the embodiment shown in FIG. 2, the method may further include the following steps:

In step 103, configuring a smoothing coefficient corresponding to the measurement parameters for the unmanned aerial vehicle in a third target signaling;

In the embodiment, the smoothing coefficient is a coefficient for smoothing filtering the current measurement parameters.

In the present step, in order to prevent the unmanned aerial vehicle from reporting the detected a burst signal, the base station may configure the smoothing coefficient for the unmanned aerial vehicle. Optionally, the third target signaling is QuantityConfigEUTRA signaling, which has a high availability.

In the related art, QuantityConfigEUTRA signaling is a signaling for describing a configuration of filtering parameters in E-UTRA (Evolved-UMTS Terrestrial Radio Access) measurement. In the embodiment of the present disclosure, the base station may configure the smoothing coefficient corresponding to the measurement parameters, that is, the layer 3 filter coefficient, for the unmanned aerial vehicle in the QuantityConfig EUTRA signaling. In the embodiment, the base station may configure a layer 3 filter coefficient corresponding to at least one of RSRP and RSRQ.

In step 104, sending the third target signaling to the unmanned aerial vehicle.

In the present step, the base station may also send the signaling content included in the third target signaling to the unmanned aerial vehicle through the RRC connection reconfiguration message.

After receiving by the unmanned aerial vehicle, the measured measurement parameters can be smoothing filtered according to the layer 3 filter coefficient, and the measurement parameters reaching the preset threshold is discarded according to the smoothing filtering result. The purpose of filtering out burst signal is achieved.

In the above described embodiment, the base station may further configure, a smoothing coefficient corresponding to the measurement parameters for the unmanned aerial vehicle in the third target signaling, and then sends the third target signaling to the unmanned aerial vehicle. The unmanned aerial vehicle performs smoothing filtering according to the smoothing coefficient, and discards the measurement parameters that reach the preset threshold according to the smoothing filtering result. Optionally, the third target signaling may be QuantityConfigEUTRA signaling, whcih has a high availability. Through the above described process, the base station can configure the smoothing coefficient for the unmanned aerial vehicle, thereby filtering out the burst signal in the measured measurement parameters, so that the target measurement is more accurate.

Figure 4:
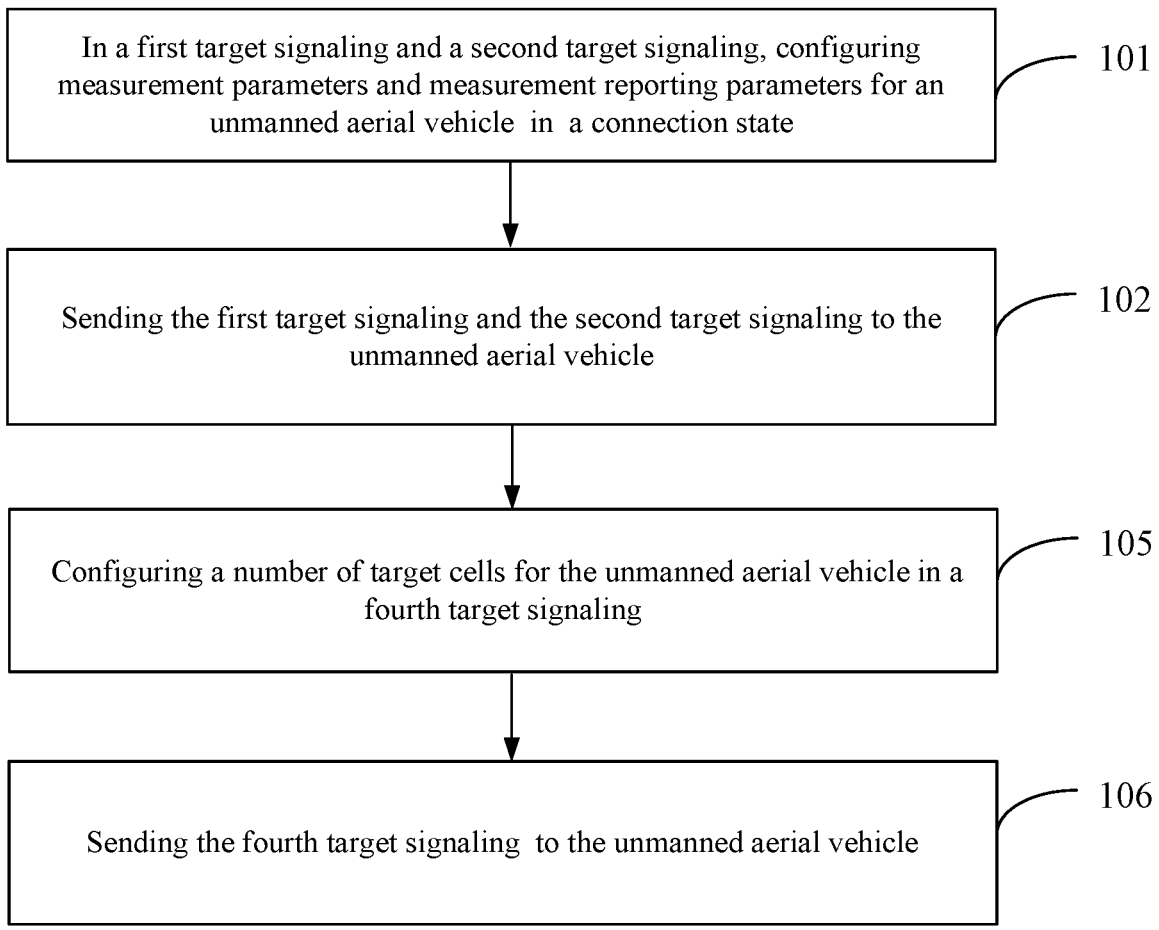
FIG. 4 is flowchart of another measurement reporting method according to an exemplary embodiment.

In an embodiment, in order to solve the problem that the number of cells reported and measured by the unmanned aerial vehicle in the related art is small, referring to FIG. 4, FIG. 4 is a flowchart of another measurement reporting method according to the embodiment shown in FIG. 2, and the method may further include the following steps:

In step 105, configuring a number of target cells for the unmanned aerial vehicle in a fourth target signaling;

In the embodiment, the number of target cells is the maximum value of the total number of the multiple target cells.

Optionally, the fourth target signaling may be maxCell-Report signaling, which has a high availability.

In the related art, the maxCellReport signaling is used to define the maximum value of the number of cells corresponding to the measurement reporting parameters in the measurement report reported by the terminal, and the value is 8 in the related art.

In the embodiment of the present disclosure, when the unmanned aerial vehicle is in the connection state, that is, during the flight process, more cells are detected than that when the unmanned aerial vehicle is on the ground. Therefore, a higher number of target cells can be configured for the unmanned aerial vehicle in the fourth target signaling, for example, the number may be 32.

In step 106, sending the fourth target signaling to the unmanned aerial vehicle.

In the present step, similarly, the base station may also send the signaling content included in the fourth target signaling to the unmanned aerial vehicle through the RRC connection reconfiguration message.

Correspondingly, the number of cells corresponding to the measurement reporting parameter included in the measurement report reported by the unmanned aerial vehicle does not exceed the number of the target cells.

In the above described embodiment, the base station may further configure the number of the target cells for the unmanned aerial vehicle in the fourth target signaling. The number of the target cell is the maximum value of the total number of the multiple target cells. Further, the base station sends the fourth target signaling to the unmanned aerial vehicle, and the measurement report reported by the unmanned aerial vehicle includes measurement reporting parameters corresponding to the target number of cells, respectively. The number of targets does not exceed the number of target cells. Optionally, the fourth target signaling may be maxCellReport signaling, which has a high availability. Through the above described process, the base station can configure the number of target cells for the unmanned aerial vehicle in the fourth target signaling, so that the number of cells included in the measurement report reported by the unmanned aerial vehicle is more. Thereby, the problem that the number of cells reported in the measurement report in the related art is small is solved.

The measurement reporting method provided by the embodiment of the present disclosure is secondly introduced from the unmanned aerial vehicle side.

Figure 5:
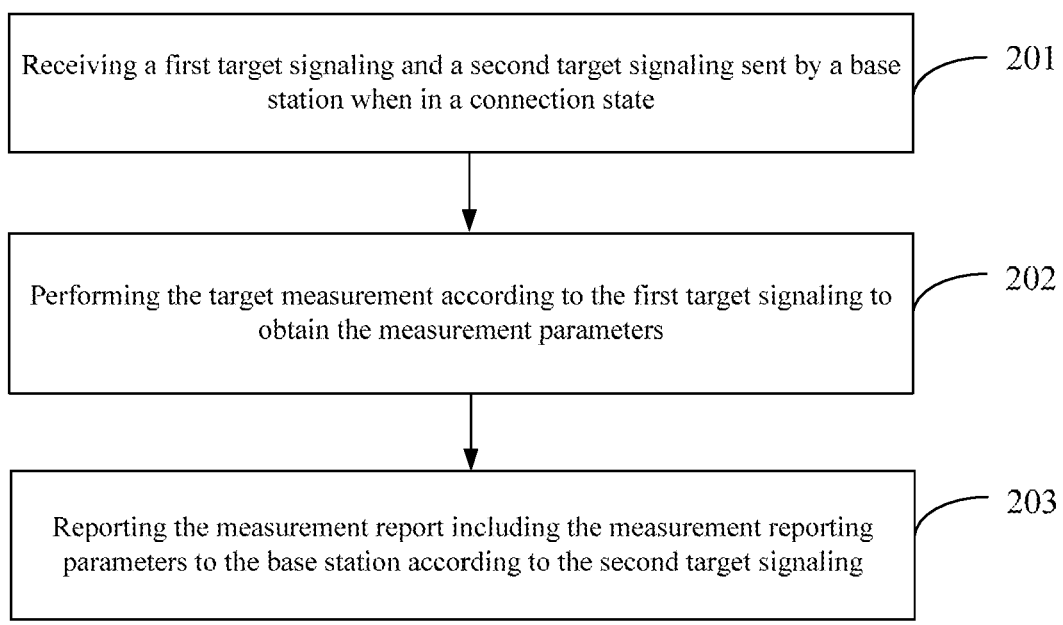
FIG. 5 is flowchart of another measurement reporting method according to an exemplary embodiment.

Referring to FIG. 5, FIG. 5 is another flowchart showing a measurement reporting method, which may be applied to a unmanned aerial vehicle, according to an exemplary embodiment, and includes the following steps:

In step 201, receiving a first target signaling and a second target signaling sent by a base station when in a connection state;

In the embodiment, the first target signaling is a signaling for configuring measurement parameters for the unmanned aerial vehicle. The measurement parameters are parameters that the unmanned aerial vehicle needs to measure when performing a target measurement. The target measurement is a measurement of a cell handover according to channel quality corresponding to multiple target cells, the multiple target cells include: a serving cell in which the unmanned aerial vehicle is currently located and at least one cell adjacent to the serving cell; the second target signaling is a signaling for configuring the measurement reporting parameters for the unmanned aerial vehicle. The measurement reporting parameters are parameters respectively corresponding to the multiple target cells and included in the measurement report of the target measurement reported by the unmanned aerial vehicle;

In step 202, performing the target measurement according to the first target signaling to obtain the measurement parameters;

In step 203, reporting the measurement report including the measurement reporting parameters to the base station according to the second target signaling.

In the above described embodiment, when the unmanned aerial vehicle is in the connection state, it can receive the first target signaling and the second target signaling sent by the base station. The base station configures the measurement parameters and the measurement reporting parameters for the unmanned aerial vehicle in the first target signaling and the second target signaling, respectively. The unmanned aerial vehicle can perform the target measurement according to the first target signaling to obtain the measurement parameters. Further, after the target measurement is completed, the measurement report including the measurement reporting parameters is reported to the base station according to the second target signaling. Through the above described process, the target unmanned aerial vehicle can normally perform the target measurement and report the measurement report during the flight process, which ensures the accuracy and timeliness of the target measurement and reporting measurement report of the unmanned aerial vehicle.

For the above described step 201, optionally, the first target signaling is a triggerQuantity signaling, and the second target signaling is reportQuantity signaling. In the triggerQuantity signaling and the reportQuantity signaling, the base station configures measurement parameters and measurement reporting parameters for the unmanned aerial vehicle. Further, the base station sends the signaling content corresponding to the triggerQuantity signaling and the reportQuantity signaling to the unmanned aerial vehicle through the RRC connection reconfiguration message. The unmanned aerial vehicle receives them in accordance with related art.

In the embodiment, the measurement parameters configured by the base station for the unmanned aerial vehicle includes at least one of a reference signal received power RSRP for characterizing the downlink channel quality of the current cell and a reference signal received quality RSRQ for characterizing a downlink channel quality of the current cell. Correspondingly, the measurement reporting parameters may be consistent with the measurement parameters, or the measurement reporting parameters includes at least one of RSRP and RSRQ.

For the above described step 202, after receiving the first target signaling and the second target signaling, the unmanned aerial vehicle may perform the target measurement according to the first target signaling, and measures the reference signal received power RSRP and the reference signal received quality RSRQ sent by the base stations of the multiple target cells according to the related art. The multiple target cells include a serving cell in which the unmanned aerial vehicle is currently located during flight process and at least one cell adjacent to the serving cell.

For the above described step 203, after obtaining the measurement parameters, the unmanned aerial vehicle may report the measurement report of the target measurement to the base station. Optionally, the unmanned aerial vehicle carries the measurement reporting parameters in the measurement report according to the measurement reporting parameters configured in the second target signaling.

For example, the unmanned aerial vehicle measures the RSRP and the RSRQ corresponding to the multiple target cells respectively, and the RSRP and the RSRQ corresponding to each target cell may be included in the measurement report.

After receiving the measurement report, the base station determines, the downlink channel quality corresponding to each target cell of the unmanned aerial vehicle according to the RSRP and the RSRQ corresponding to each target cell, so as to control the unmanned aerial vehicle to perform cell handover.

In the above described embodiment, when the unmanned aerial vehicle is in the connection state, according to the measurement parameters and the measurement reporting parameters configured by the base station, so that the target unmanned aerial vehicle can normally perform the target measurement and report the measurement report of the target measurement during the flight process, and it also ensures the accuracy and timeliness of the target measurement and reporting measurement report of the unmanned aerial vehicle.

Figure 6:
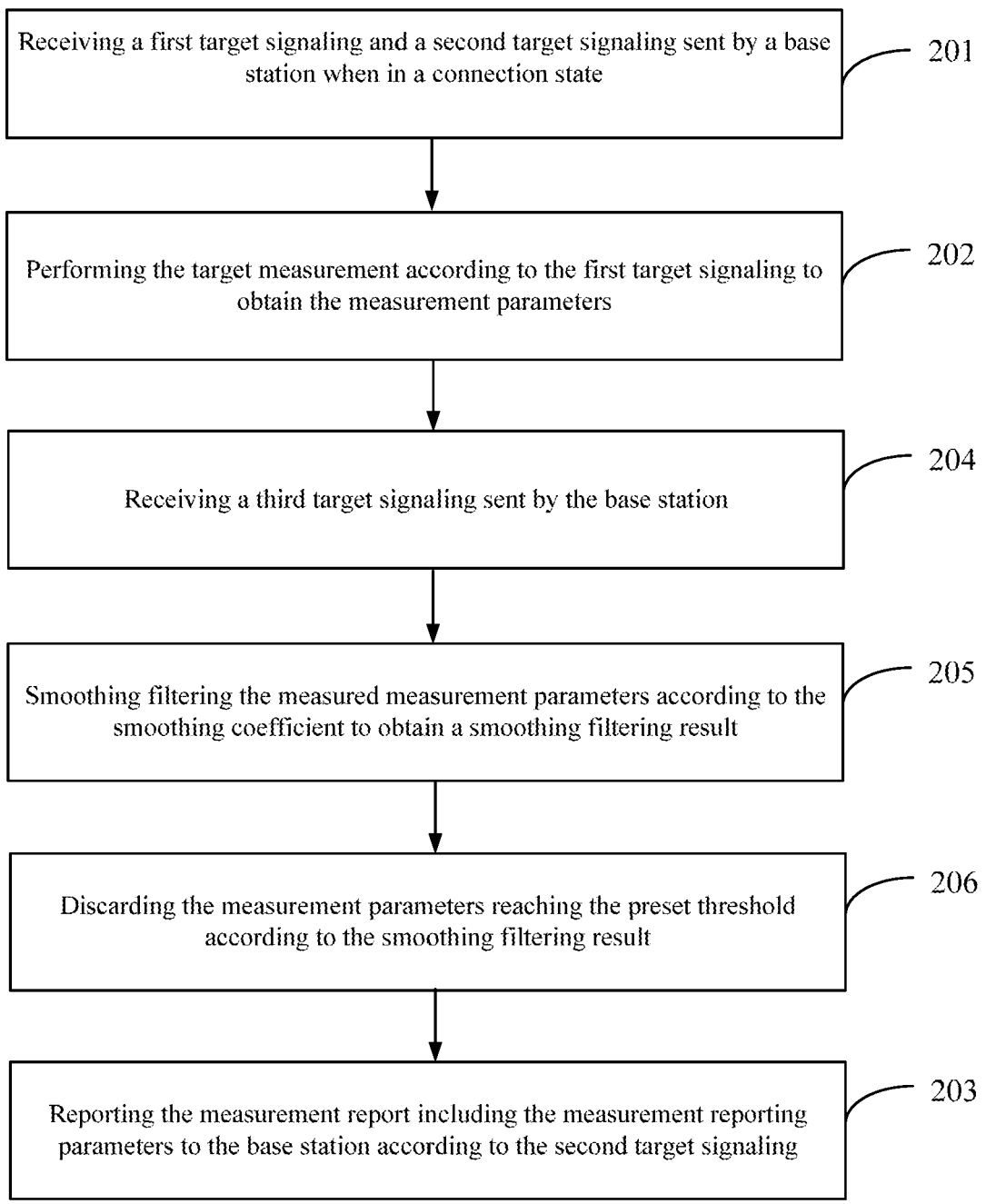
FIG. 6 is flowchart of another measurement reporting method according to an exemplary embodiment.

In an embodiment, in order to filter out the burst signal, referring to FIG. 6, FIG. 6 is a flowchart of another measurement reporting method according to the embodiment shown in FIG. 5, the method may further include the following steps:

In step 204, receiving a third target signaling sent by the base station;

In the embodiment, the third target signaling is a signaling for configuring the smoothing coefficient corresponding to the measurement parameters for the unmanned aerial vehicle, and the smoothing coefficient is a coefficient for smoothing filtering the current measurement parameters.

In the present step, the base station may configure the smoothing coefficient for the unmanned aerial vehicle through the third target signaling. Optionally, the third target signaling is QuantityConfigEUTRA signaling. The smoothing coefficient is a layer 3 filter coefficient that performs smoothing filtering on the measurement parameters of the unmanned aerial vehicle.

The base station sends the signaling content included in the third target signaling to the unmanned aerial vehicle through an RRC connection reconfiguration message, and the unmanned aerial vehicle receives them according to the relatedart.

In step 205, smoothing filtering the measured measurement parameters according to the smoothing coefficient to obtain a smoothing filtering result;

In the present step, the unmanned aerial vehicle may calculate the smoothing coefficient and the measurement parameters according to a predefined smoothing filtering formula, and use the calculation result as a smoothing filtering result.

Optionally, the smoothing filtering formula may be a product of a smoothing coefficient and measurement parameters, or other more complicated smoothing filtering formula including the smoothing coefficient and the measurement parameters.

For example, the unmanned aerial vehicle substitutes the smoothing coefficient and the RSRP of the downlink reference signal sent by the base station of the currently measured target cell into the above described smoothing filtering formula to obtain a calculation result, and the calculation result can be used as a smoothing filtering result.

In step 206, discarding the measurement parameters reaching the preset threshold according to the smoothing filtering result.

In the present step, after the measurement parameters are obtained by the unmanned aerial vehicle, in a case that the result of the smoothing filtering does not reach the preset threshold, it is determined that the currently detected measurement parameters belong to a burst signal, and the measurement parameters are discarded.

In the above described embodiment, when the unmanned aerial vehicle performs smoothing filtering on the measurement parameters according to the smoothing coefficient to obtain a smoothing filtering result, the smoothing coefficient and the measurement parameters are calculated according to a predefined smoothing filtering formula, and the calculation result is used as a smoothing filtering result. Thereby, the measurement parameters reaching the preset threshold are discarded. The burst signal is filtered out in the measured measurement parameters, which makes the target measurement more accurate.

Figure 7:
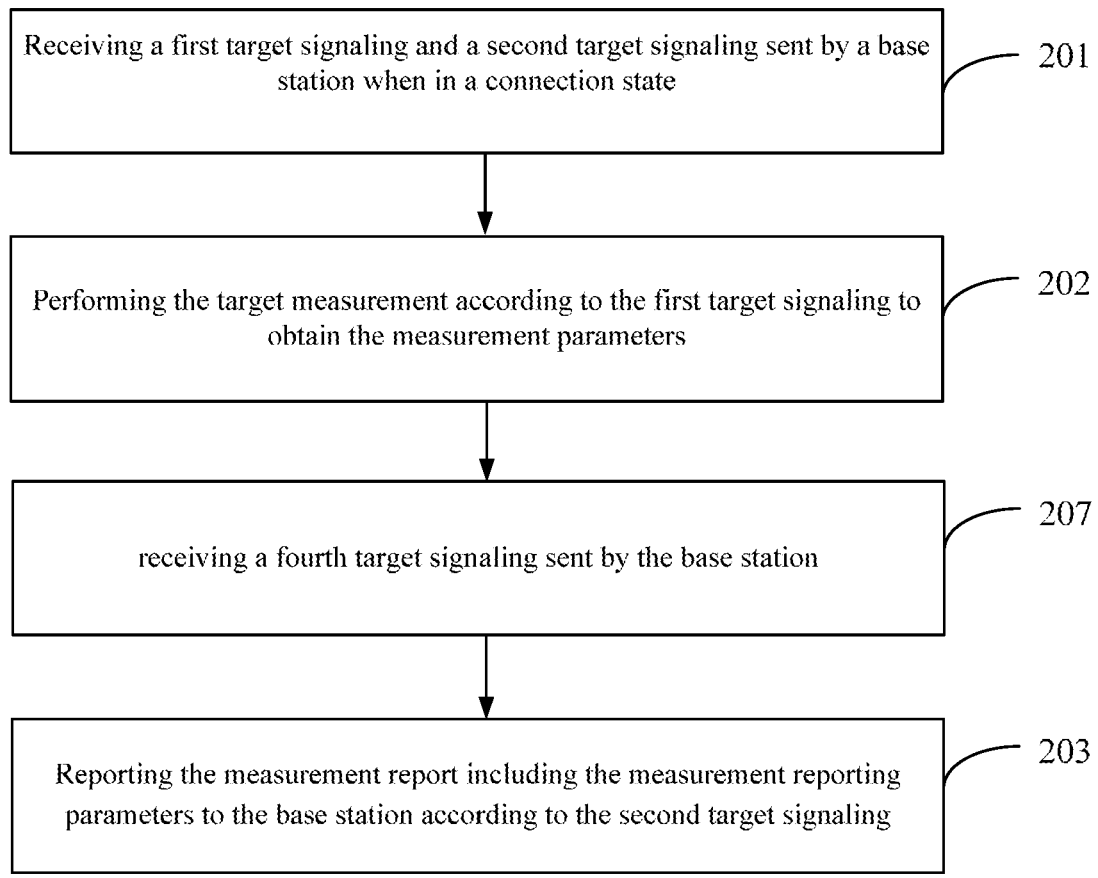
FIG. 7 is flowchart of another measurement reporting method according to an exemplary embodiment.

In an embodiment, in order to solve the problem that the number of cells measured and reported by the unmanned aerial vehicle in the related art is small, referring to FIG. 7, FIG. 7 is a flowchart of another measurement reporting method according to the embodiment shown in FIG. 5, and the method may further include the following steps:

In step 207, receiving a fourth target signaling sent by the base station;

Optionally, the fourth target signaling is signaling for configuring the number of target cells for the unmanned aerial vehicle, such as maxCellReport signaling. The number of target cells is the maximum value of the total number of the multiple target cells.

In the present step, the base station may also send the signaling content included in the fourth target signaling to the unmanned aerial vehicle through the RRC connection reconfiguration message, and after receiving by the unmanned aerial vehicle, the number of the target cells may be determined.

Correspondingly, step 203 can be specifically:

In a case that the measurement parameters include RSRP or RSRQ, selecting a target number of the measurement parameters in the measured measurement parameters directly in descending order as the measurement reporting parameters. The target number does not exceed the number of the target cells.

For example, in a case that the unmanned aerial vehicle measures the RSRQ respectively corresponding to the multiple target cells, the unmanned aerial vehicle selects the target number of RSRQ in descending order as the measurement reporting parameters. In the embodiment, in a case that the number of the target cells is 32, the number of measurement reporting parameters RSRQ selected by the unmanned aerial vehicle does not exceed 32.

In a case that the measurement parameters include RSRP and RSRQ, the unmanned aerial vehicle selects the target number of the measurement parameters as the measurement reporting parameters in at least one of RSRP and RSRQ in descending order.

For example, in a case that the unmanned aerial vehicle measures the RSRP and the RSRQ corresponding to the multiple target cells, respectively, the unmanned aerial vehicle uses at least one of the RSRP and the RSRQ selected in descending order as the measurement reporting parameters. In the embodiment, the number of cells corresponding to the selected measurement reporting parameters cannot exceed the number 32 of the target cells.

After selecting the measurement reporting parameters, the unmanned aerial vehicle reports the measurement report including the selected measurement reporting parameters to the base station according to the related art.

In the above described embodiment, the unmanned aerial vehicle can select the measurement parameters of target number in descending order as the measurement reporting parameters. In the embodiment, the target number does not exceed the number of target cells configured by the base station for the unmanned aerial vehicle in the fourth target signaling. Further, the unmanned aerial vehicle reports a measurement report including the selected measurement reporting parameters to the base station. In the above described embodiment, the unmanned aerial vehicle reports the measurement report according to the number of the target cells configured by the base station, so that the number of cells included in the measurement report reported by the unmanned aerial vehicle is more. The problem that the number of cells reported in the measurement report in the related art is small is solved.

Figure 8A:
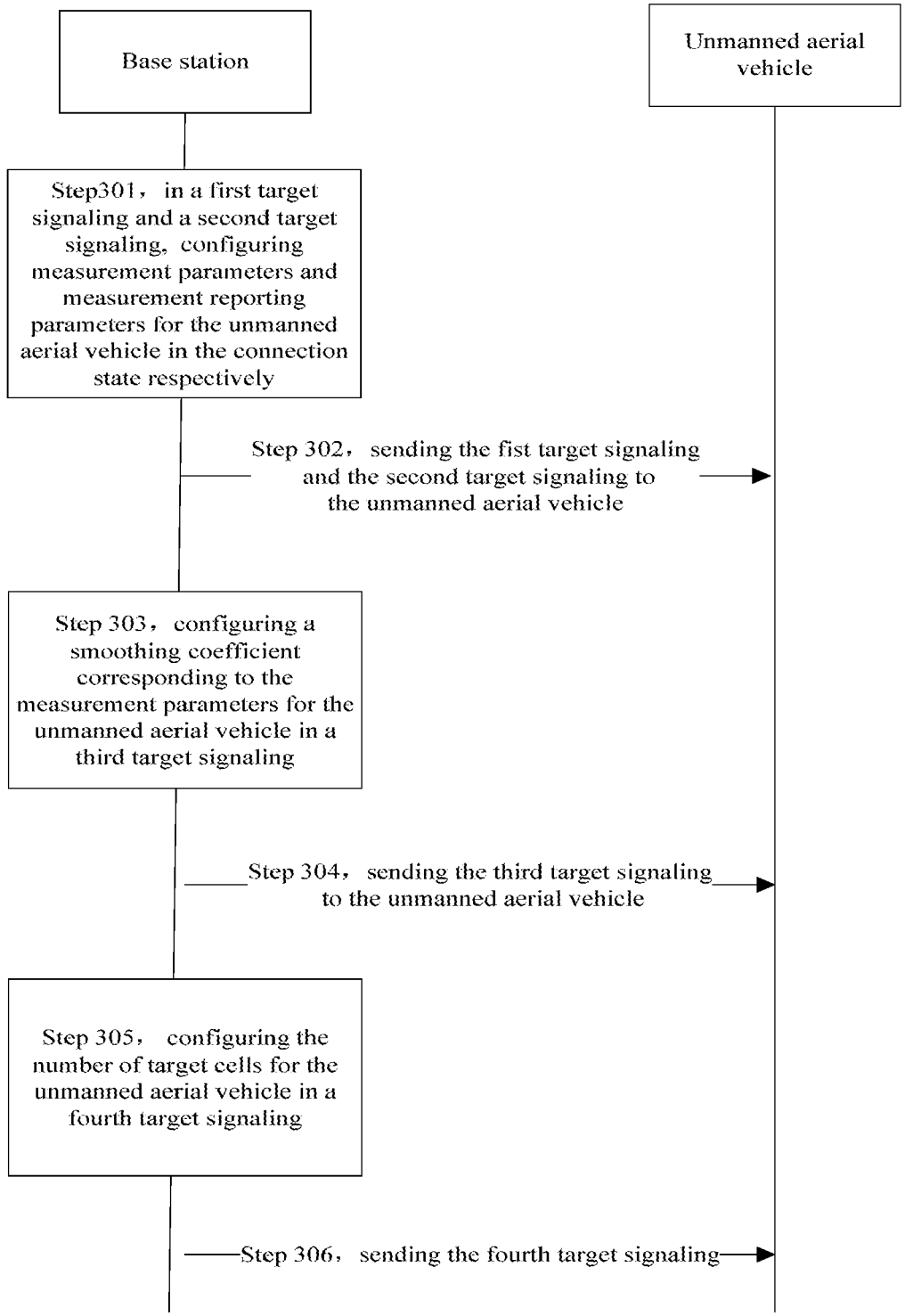
FIG. 8A is a first portion of a flowchart of another measurement reporting method according to an exemplary embodiment.
Figure 8B:
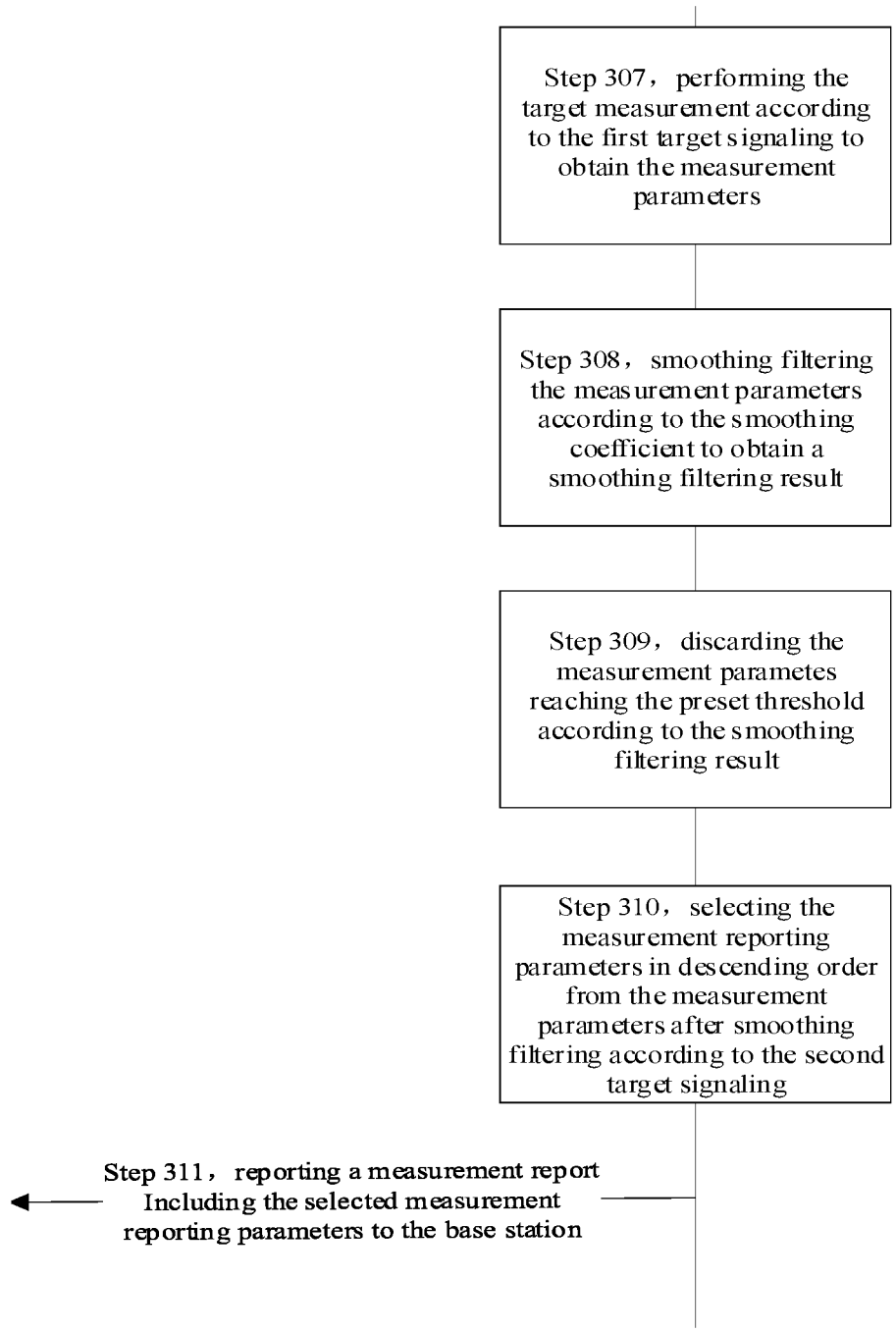
FIG. 8B is a second portion of the flowchart of the other measurement reporting method according to an exemplary embodiment.

Referring to FIG. 8A and FIG. 8B, another flowchart showing another measurement reporting method according to an exemplary embodiment is illustrated, and includes the following steps:

In step 301, in the first target signaling and the second target signaling, the base station configuring the measurement parameters and the measurement reporting parameters for the unmanned aerial vehicle in the connection state, respectively.

In the embodiment, the first target signaling is a trigger-Quantity signaling, and the second target signaling is reportQuantity signaling. The availability is high.

The measurement parameters are parameters that the unmanned aerial vehicle needs to measure when performing the target measurement, and the target measurement is a measurement of the cell handover according to the channel quality corresponding to the multiple target cells, the multiple target cells include: a serving cell in which the unmanned aerial vehicle is currently located and at least one cell adjacent to the serving cell; the measurement reporting parameters are parameters respectively corresponding to the multiple target cells and included in the measurement report of the target measurement reported by the unmanned aerial vehicle;

The measurement parameters include at least one of the following: a reference signal received power RSRP for characterizing a downlink channel quality of a current cell; a reference signal received quality RSRQ for characterizing the downlink channel quality of the current cell. Correspondingly, in a case that the measurement parameters include RSRP or RSRQ, the measurement reporting parameters may be consistent with the measurement parameters; in a case that the measurement parameters include RSRP or RSRQ, the measurement reporting parameters include at least one of RSRP and RSRQ.

Characterizing the downlink channel quality of the current cell by at least one of RSRP and RSRQ, thereby the corresponding measurement reporting parameters are determined according to the measurement parameters, so that the unmanned aerial vehicle can accurately and timely perform the target measurement and report the measurement report during the flight process.

In step 302, the base station sends the first target signaling and the second target signaling to the unmanned aerial vehicle.

In step 303, the base station configures a smoothing coefficient corresponding to the measurement parameters for the unmanned aerial vehicle in the third target signaling;

The smoothing coefficient is a coefficient for smoothing filtering the current measurement parameters; The third target signaling is QuantityConfigEUTRA signaling. It has a high availability.

In step 304, the base station sends the third target signaling to the unmanned aerial vehicle.

In step 305, the base station configures the number of target cells for the unmanned aerial vehicle in the fourth target signaling;

In the embodiment, the number of target cells is the maximum value of the total number of the multiple target cells; the fourth target signaling is QuantityConfigEUTRA signaling.

In step 306, the base station sends the fourth target signaling to the unmanned aerial vehicle.

In step 307, the unmanned aerial vehicle performs the target measurement according to the first target signaling to obtain the measurement parameters.

In step 308, the unmanned aerial vehicle smooths and filters the measurement parameters according to the smoothing coefficient to obtain a smoothing filtering result.

In step 309, the unmanned aerial vehicle discards the measurement parameters reaching the preset threshold according to the smoothing filtering result.

In step 310, the unmanned aerial vehicle selects the measurement reporting parameters in descending order from the measurement parameters after smoothing filtering according to the second target signaling.

In the embodiment, the number of cells corresponding to the selected measurement reporting parameters cannot exceed the number of target cells.

In step 311, the unmanned aerial vehicle reports a measurement report including the selected measurement reporting parameters to the base station.

In the above described embodiment, the base station can respectively configure the measurement parameters and the measurement reporting parameters for the unmanned aerial vehicle in the connection state, so that the unmanned aerial vehicle can normally perform the target measurement and report the measurement report of the target measurement during the flight process, and ensures the accuracy and timeliness of the target measurement and reporting measurement report of the unmanned aerial vehicle.

For the embodiments of the foregoing methods, for the sake of simple description, they are all expressed as a series of action combinations. However, those skilled in the art should understand that the present disclosure is not limited by the described order of actions. Because certain steps may be performed in other sequences or concurrently in accordance with the present disclosure.

Secondly, those skilled in the art should also understand that the embodiments described in the specification are all optional embodiments, and the actions and modules involved are not necessarily required by the present disclosure.

Corresponding to the embodiments described above of the application function implementation method, the present disclosure also provides an application function implementation apparatus and corresponding embodiments.

Figure 9:
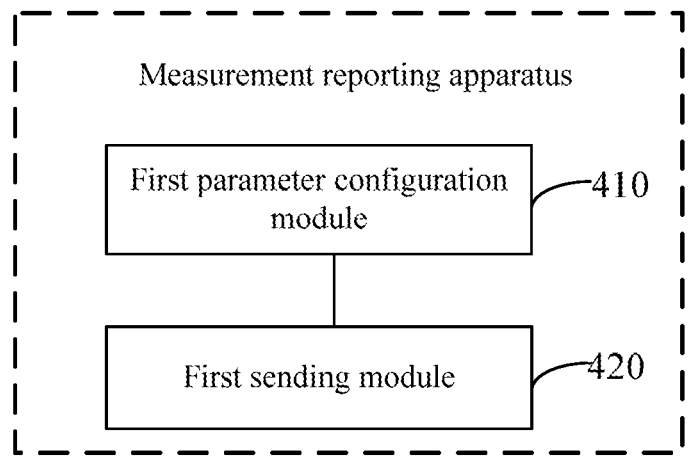
FIG. 9 is a block diagram of a measurement reporting apparatus according to an exemplary embodiment.

Referring to FIG. 9, FIG. 9 is a block diagram of a measurement reporting apparatus according to an exemplary embodiment, the apparatus is applied to a base station, and the apparatus includes:

A first parameter configuration module 410, configured to configure a measurement parameters and the measurement reporting parameter for the unmanned aerial vehicle in the connection state in a first target signaling and a second target signaling; in the embodiment, the measurement parameters are parameters that the unmanned aerial vehicle needs to measure when performing the target measurement, and the target measurement is a measurement of the cell handover according to the channel quality corresponding to the multiple target cells, the multiple target cells include: a serving cell in which the unmanned aerial vehicle is currently located and at least one cell adjacent to the serving cell; the measurement reporting parameters are parameters respectively corresponding to the multiple target cells and included in the measurement report of the target measurement reported by the unmanned aerial vehicle.

A first sending module 420, configured to send the first target signaling and the second target signaling to the unmanned aerial vehicle, so that the unmanned aerial vehicle performs target measurement according to the first target signaling; after the measurement parameters are obtained, report the measurement report including the measurement reporting parameters to the base station according to the second target signaling.

In above described embodiment, in the first target signaling and the second target signaling, the base station can respectively configure the measurement parameters and the measurement reporting parameters for the unmanned aerial vehicle in the connection state. Further, the base station sends the first target signaling and the second target signaling to the unmanned aerial vehicle, the unmanned aerial vehicle performs target measurement according to the measurement parameters; after the measurement parameters are obtained, the measurement report including the measurement reporting parameters is reported to the base station according to the second target signaling. Through the above described process, the base station can respectively configure the measurement parameters and the measurement reporting parameters for the unmanned aerial vehicle in the connection state, so that the unmanned aerial vehicle can normally perform the target measurement and report the measurement report of the target measurement during the flight process, and ensures the accuracy and timeliness of the target measurement and reporting measurement report of the unmanned aerial vehicle.

Optionally, the first target signaling is a triggerQuantity signaling, and the second target signaling is reportQuantity signaling. The availability is high.

Optionally, the measurement parameters include at least one of the following:

A reference signal received power RSRP for characterizing a downlink channel quality of a current cell;

A reference signal received quality RSRQ for characterizing the downlink channel quality of the current cell.

Optionally, in a case that the measurement parameters include RSRP or RSRQ, the measurement reporting parameters may be consistent with the measurement parameters;

In a case that the measurement parameters include RSRP and RSRQ, the measurement reporting parameters include at least one of RSRP and RSRQ.

In the above described embodiment, the measurement parameters may include at least one of a reference signal received power RSRP for characterizing a downlink channel quality of the current cell and a reference signal received quality RSRQ for characterizing a downlink channel quality of the current cell. Correspondingly, in a case that the measurement parameters include RSRP or RSRQ, the measurement reporting parameters may be consistent with the measurement parameters; in a case that the measurement parameters include RSRP and RSRQ, the measurement reporting parameters include at least one of RSRP and RSRQ. In the embodiments of the present disclosure, characterizing the downlink channel quality of the current cell by at least one of RSRP and RSRQ, thereby the corresponding measurement reporting parameters are determined according to the measurement parameters, so that the unmanned aerial vehicle can accurately and timely perform the target measurement and report the measurement report during the flight process.

Figure 10:
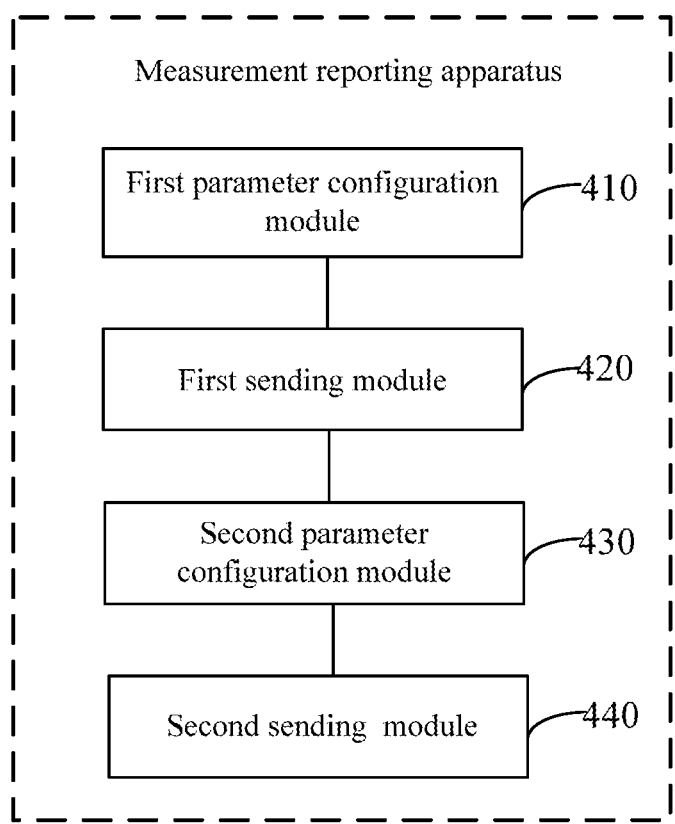
FIG. 10 is a block diagram of another measurement reporting apparatus according to an exemplary embodiment.

Referring to FIG. 10, FIG. 10 is a block diagram of another measurement reporting apparatus on the base of the embodiment shown in FIG. 9, the apparatus further including:

A second parameter configuration module 430, configured to configure a smoothing coefficient corresponding to the measurement parameters for the unmanned aerial vehicle in the third target signaling; the smoothing coefficient is a coefficient for smoothing filtering the current measurement parameters;

A second sending module 440, configured to send the third target signaling to the unmanned aerial vehicle, so that the unmanned aerial vehicle performs smoothing filtering on the measured measurement parameters according to the smoothing coefficient, and discard the measurement parameters that reaches a preset threshold according to the smoothing filtering result.

In the above described embodiment, the base station may further configure a smoothing coefficient corresponding to the measurement parameters for the unmanned aerial vehicle in the third target signaling, and then send the third target signaling to the unmanned aerial vehicle. The unmanned aerial vehicle performs smoothing filtering according to the smoothing coefficient, and discards the measurement parameters that reach the preset threshold according to the smoothing filtering result. Through the above described process, the base station can configure the smoothing coefficient for the unmanned aerial vehicle, thereby filtering out the burst signal in the measured measurement parameters, so that the target measurement is more accurate.

Optionally, the third target signaling is QuantityConfigEUTRA signaling, which has a high availability.

Figure 11:
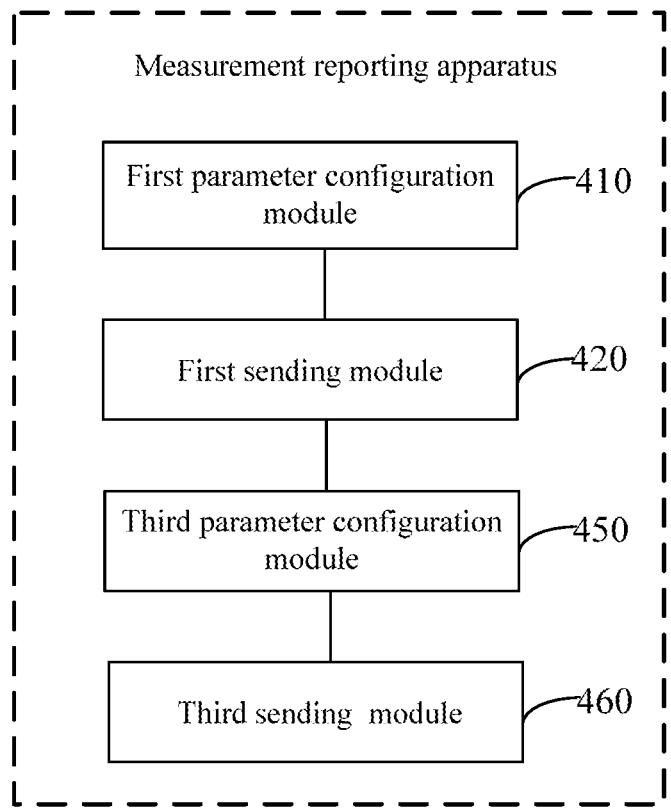
FIG. 11 is a block diagram of another measurement reporting apparatus according to an exemplary embodiment.

Referring to FIG. 11, FIG. 11 is a block diagram of another measurement reporting apparatus on the base of the embodiment shown in FIG. 9, the apparatus further including:

A third parameter configuration module 450, configured to configure a number of target cells for the unmanned aerial vehicle in a fourth target signaling; the number of target cells is the maximum value of the total number of the multiple target cells;

A third sending configuration module 460, configured to send the fourth target signaling to the unmanned aerial vehicle, so that the measurement report reported by the unmanned aerial vehicle includes the measurement reporting parameters corresponding to the cells of target number respectively. The target number does not exceed the number of target cells.

In the above described embodiment, the base station may further configure the number of the target cells for the unmanned aerial vehicle in the fourth target signaling. The number of the target cells is the maximum value of the total number of the multiple target cells. Further, the base station sends the fourth target signaling to the unmanned aerial vehicle, and the measurement report reported by the unmanned aerial vehicle includes measurement reporting parameters corresponding to the cells of target number respectively. The target number does not exceed the number of target cells. Through the above described process, the base station can configure the number of the target cells for the unmanned aerial vehicle in the fourth target signaling, so that the number of cells included in the measurement report reported by the unmanned aerial vehicle is more. Thereby, the problem that the number of cells reported in the measurement report in the related art is small is solved.

Optionally, the fourth target signaling is maxCellReport signaling, which has a high availability.

Figure 12:
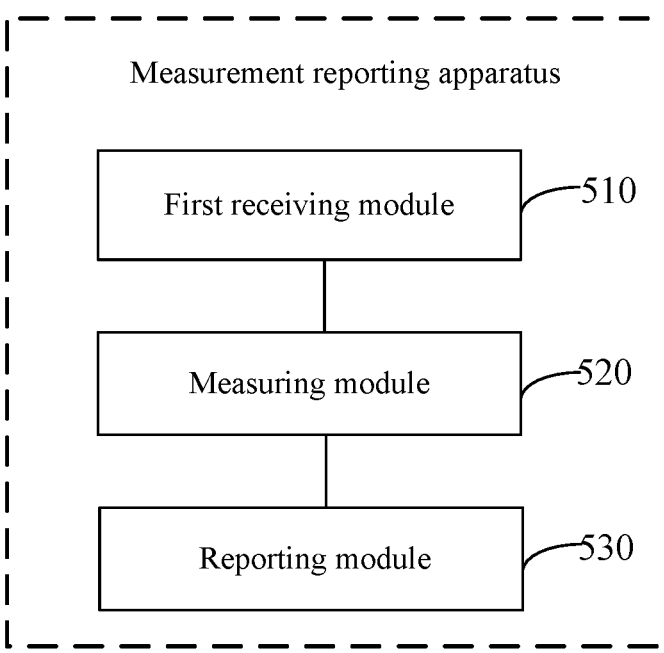
FIG. 12 is a block diagram of another measurement reporting apparatus according to an exemplary embodiment.

Referring to FIG. 12, FIG. 12 is a block diagram of a measurement reporting apparatus according to an exemplary embodiment, the apparatus is applied to a unmanned aerial vehicle, and the apparatus includes:

A first receiving module 510, configured to receive the first target signaling and the second target signaling sent by the base station when in a connection state; in the embodiment, the first target signaling is a signaling for configuring measurement parameters for the unmanned aerial vehicle. The measurement parameters are parameters that the unmanned aerial vehicle needs to measure when performing a target measurement. The target measurement is a measurement of a cell handover according to a channel quality corresponding to multiple target cells, the multiple target cells include: a serving cell in which the unmanned aerial vehicle is currently located and at least one cell adjacent to the serving cell; the second target signaling is a signaling for configuring the measurement reporting parameters for the unmanned aerial vehicle. The measurement reporting parameters are parameters respectively corresponding to the multiple target cells and included in the measurement report of the target measurement reported by the unmanned aerial vehicle;

A measuring module 520, configured to perform the target measurement according to the first target signaling to obtain the measurement parameters;

A reporting module 530, configured to report the measurement report including the measurement reporting parameters to the base station according to the second target signaling.

In the above described embodiment, when the unmanned aerial vehicle is in the connection state, it can receive the first target signaling and the second target signaling sent by the base station. The base station configures the measurement parameters and the measurement reporting parameters for the unmanned aerial vehicle in the first target signaling and the second target signaling, respectively. The unmanned aerial vehicle can perform the target measurement according to the first target signaling and obtain the measurement parameters. Further, after the target measurement is completed, the measurement report including the measurement reporting parameters is reported to the base station according to the second target signaling. Through the above described process, the target unmanned aerial vehicle can normally perform the target measurement and the report the measurement report during the flight process, which ensures the accuracy and timeliness of the target measurement and reporting measurement report of the unmanned aerial vehicle.

Optionally, the first target signaling is a triggerQuantity signaling, and the second target signaling is reportQuantity signaling. The availability is high.

Optionally, the measurement parameters include at least one of the following:

A reference signal received power RSRP for characterizing a downlink channel quality of a current cell;

A reference signal received quality RSRQ for characterizing the downlink channel quality of the current cell.

Optionally, in a case that the measurement parameters includes RSRP or

RSRQ, the measurement reporting parameters may be consistent with the measurement parameters;

In a case that the measurement parameters include RSRP and RSRQ, the measurement reporting parameters include at least one of RSRP and RSRQ.

In the above described embodiment, the measurement parameters may include at least one of a reference signal received power RSRP for characterizing a downlink channel quality of the current cell and a reference signal received quality RSRQ for characterizing a downlink channel quality of the current cell. Correspondingly, in a case that the measurement parameters include RSRP or RSRQ, the measurement reporting parameters may be consistent with the measurement parameters; in a case that the measurement parameters include RSRP and RSRQ, the measurement reporting parameters include at least one of RSRP and RSRQ. In the embodiments of the present disclosure, characterizing the downlink channel quality of the current cell by at least one of RSRP and RSRQ, thereby the corresponding measurement reporting parameters are determined according to the measurement parameters, so that the unmanned aerial vehicle can accurately and timely perform the target measurement and report the measurement report during the flight process.

Figure 13:
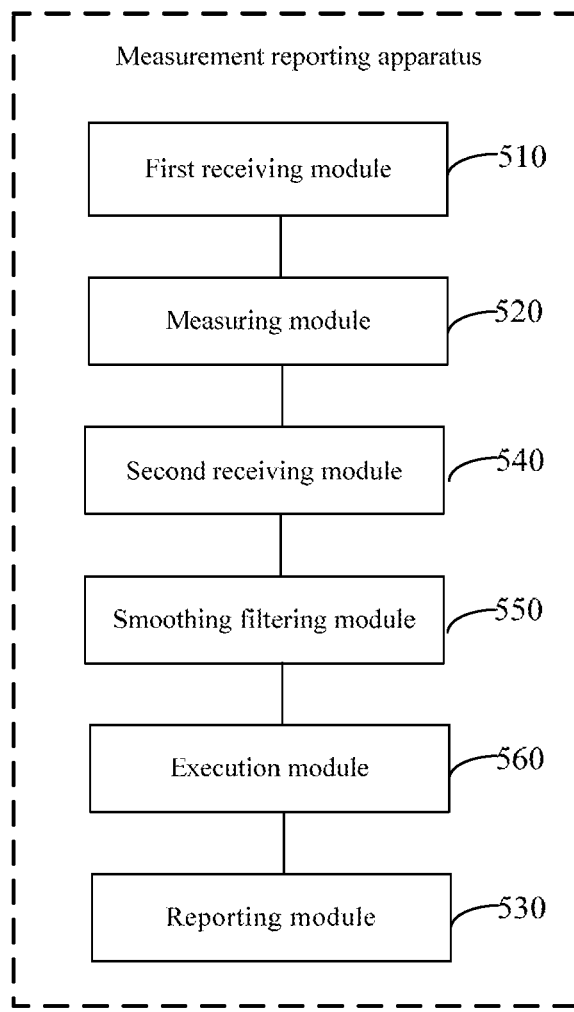
FIG. 13 is a block diagram of another measurement reporting apparatus according to an exemplary embodiment.

Referring to FIG. 13, FIG. 13 is a block diagram of another measurement reporting apparatus according to the base of the embodiment shown in FIG. 12, the apparatus further including:

A second receiving module 540, configured to receive the third target signaling sent by the base station, the third target signaling is a signaling for configuring the smoothing coefficient corresponding to the measurement parameters for the unmanned aerial vehicle. The smoothing coefficient is a coefficient for smoothing filtering the current measurement parameters;

A smoothing filtering module 550, configured to smooth and filter the measured measurement parameters according to the smoothing coefficient to obtain a smoothing filtering result;

A execution module 560, configured to discard the measurement parameters reaching the preset threshold according to the smoothing filtering result.

Figure 14:
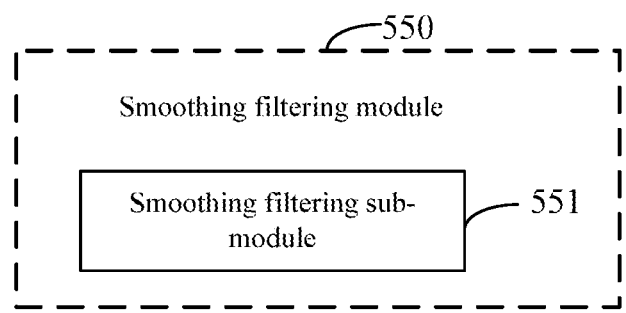
FIG. 14 is a block diagram of another measurement reporting apparatus according to an exemplary embodiment.

Referring to FIG. 14, FIG. 14 is a block diagram of another measurement reporting apparatus on the base of the embodiment shown in FIG. 13, the smoothing filtering module 550 including:

A smoothing filtering sub-module 551, configured to calculate the smoothing coefficient and the measurement parameters according to a predefined smoothing filtering formula, and use the calculation result as a smoothing filtering result.

In the above described embodiment, when the unmanned aerial vehicle performs smoothing filtering on the measurement parameters according to the smoothing coefficient to obtain a smoothing filtering result, the smoothing coefficient and the measurement parameters are calculated according to a predefined smoothing filtering formula, and the calculation result is used as a smoothing filtering result. Thereby, the measurement parameters reaching the preset threshold are discarded. The burst signal is filtered out in the measured measurement parameters, which makes the target measurement more accurate.

Optionally, the third target signaling is QuantityConfigEUTRA signaling, which has a high availability.

Figure 15A:
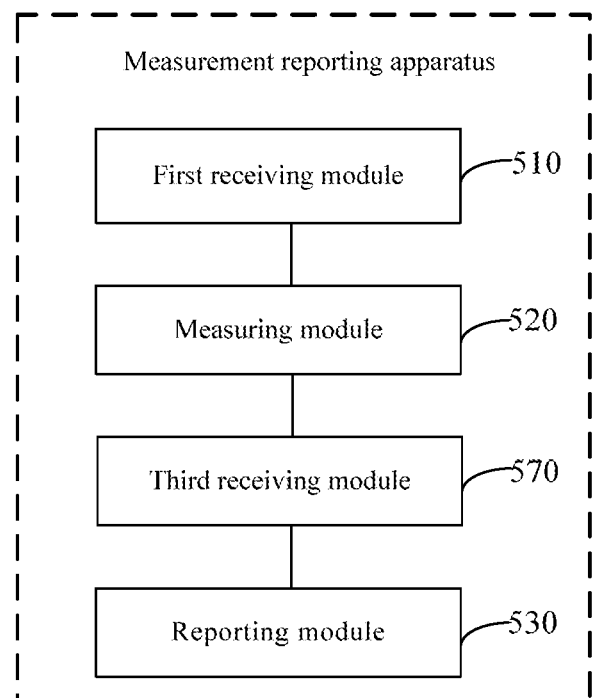
FIG. 15A is a block diagram of another measurement reporting apparatus according to an exemplary embodiment.
Figure 15B:
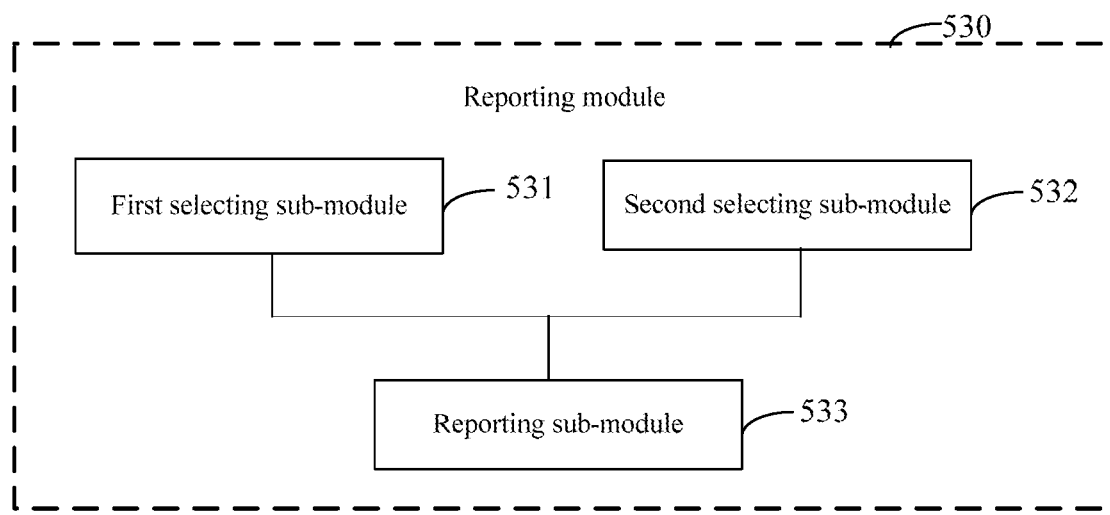
FIG. 15B is a block diagram of another measurement reporting apparatus according to an exemplary embodiment.

Referring to FIG. 15A, FIG. 15A is a block diagram of another measurement reporting apparatus on the base of the embodiment shown in FIG. 13, the apparatus further including:

A third receiving module 570, configured to receive the fourth target signaling sent by the base station. The fourth target signaling is a signaling for configuring the number of target cells for the unmanned aerial vehicle, and the number of target cells is the maximum value of a total number of the multiple target cells;

Referring to FIG. 15B, FIG. 15B is a block diagram of another measurement reporting apparatus according to the base of the embodiment shown in FIG. 13, the reporting module 530 including:

A first selecting sub-module 531, configured to select a target number of the measurement parameters from the measurement parameters in descending order as the measurement reporting parameters in a case that the measurement parameters includes RSRP or RSRQ, The number of targets does not exceed the number of target cells;

A second selecting sub-module 532, configured to select a target number of the measurement parameters from at least one of RSRP and RSRQ respectively in descending order as the measurement reporting parameters in a case that the measurement parameters include RSRP and RSRQ;

A reporting sub-module 533, configured to report a measurement report including the selected measurement reporting parameters to the base station.

In the above described embodiment, the unmanned aerial vehicle can select a target number of the measurement parameters in descending order as the measurement reporting parameters. In the embodiment, the target number does not exceed the number of target cells configured by the base station for the unmanned aerial vehicle in the fourth target signaling. Further, the unmanned aerial vehicle reports a measurement report including the selected measurement reporting parameters to the base station. In the above described embodiment, the unmanned aerial vehicle reports the measurement report according to the number of target cells configured by the base station, so that the number of cells included in the measurement report reported by the unmanned aerial vehicle is more. The problem that the number of cells reported in the measurement report in the related art is small is solved.

Optionally, the fourth target signaling may be maxCellReport signaling, which has a high availability.

For the apparatus embodiment, since it basically corresponds to the method embodiment, the correlation can be referred to the partial description of the method embodiment. The above described apparatus embodiments are merely illustrative, the above described units as separate components may or may not be physically separated. The component displayed as a unit may or may not be a physical unit. That is, it can be located in one place, or it can be distributed to multiple network units. Some or all of the modules may be selected according to actual needs to achieve the objectives of the present disclosure scheme. Those skilled in the art can understand and implement without any creative effort.

Correspondingly, the present disclosure also provides a computer readable storage medium storing a computer program for performing any one of the above described measurement reporting method for the base station side.

Correspondingly, the present disclosure also provides a computer readable storage medium storing a computer program for performing any one of the above described measurement reporting method for the unmanned aerial vehicle side.

Correspondingly, the present disclosure also provides a measurement reporting apparatus, the apparatus is applied to a base station, and includes:

Processor;

A memory, used to storing instructions executable by the processor;

In the embodiment, the processor is configured to:

In a first target signaling and a second target signaling, configure the measurement parameters and the measurement reporting parameters for the unmanned aerial vehicles in the connection state, respectively; in the embodiment, the measurement parameters are parameters that the unmanned aerial vehicle needs to measure when performing the target measurement, and the target measurement is a measurement of the cell handover according to the channel quality corresponding to the multiple target cells, the multiple target cells include: a serving cell in which the unmanned aerial vehicle is currently located and at least one cell adjacent to the serving cell; the measurement reporting parameters are parameters respectively corresponding to the multiple target cells and included in the measurement report of the target measurement reported by the unmanned aerial vehicle;

Send the first target signaling and the second target signaling to the unmanned aerial vehicle, so that the unmanned aerial vehicle performs target measurement according to the first target signaling; after the measurement parameters are obtained, report the measurement report including the measurement reporting parameters to the base station according to the second target signaling.

Figure 16:
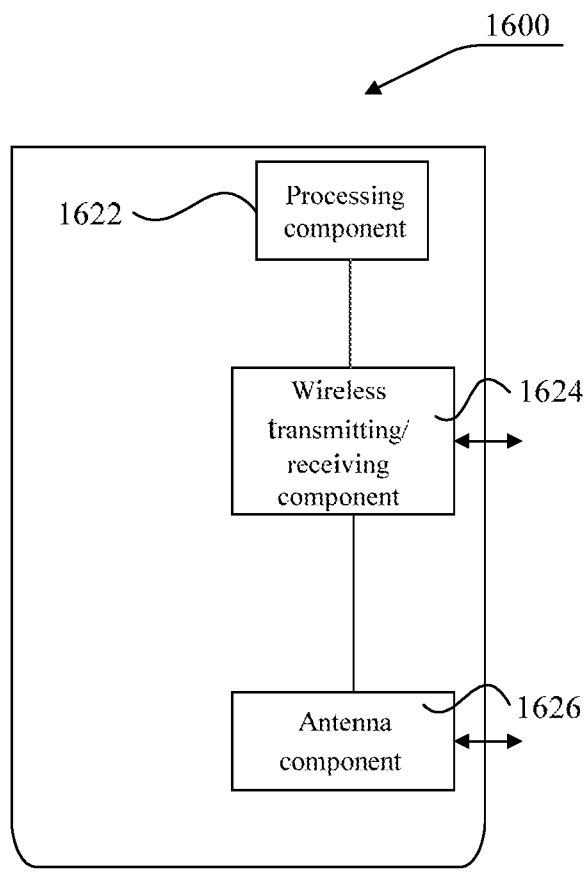
FIG. 16 is a structure schematic diagram of a measurement reporting apparatus according to an exemplary embodiment of the present disclosure.

As shown in FIG. 16, FIG. 16 is a schematic structural diagram of a measurement reporting apparatus 1600 according to an exemplary embodiment. The apparatus 1600 can be provided as a base station. Referring to FIG. 16, apparatus 1600 includes a processing component 1622, a wireless transmitting/receiving component 1624, an antenna component 1626 and a signal processing portion specific to the wireless interface. The processing component 1622 can further include one or more processors.

One processor of the processing components 1622 may be configured to:

In a first target signaling and a second target signaling, configure measurement parameters and measurement reporting parameters for an unmanned aerial vehicle in the connection state, respectively; in the embodiment, the measurement parameters are parameters that the unmanned aerial vehicle needs to measure when performing the target measurement, and the target measurement is a measurement of the cell handover according to the channel quality corresponding to the multiple target cells, the multiple target cells include: a serving cell in which the unmanned aerial vehicle is currently located and at least one cell adjacent to the serving cell; the measurement reporting parameters are parameters respectively corresponding to the multiple target cells and included in the measurement report of the target measurement reported by the unmanned aerial vehicle;

Send the first target signaling and the second target signaling to the unmanned aerial vehicle, so that the unmanned aerial vehicle perform target measurement according to the first target signaling; after the measurement parameters are obtained, report the measurement report including the measurement reporting parameters to the base station according to the second target signaling.

Correspondingly, the present disclosure also provides a measurement reporting apparatus, the apparatus is applied to a unmanned aerial vehicle, and includes:

A processor;

Memory, used to storing instructions executable by the processor;

In the embodiment, the processor is configured to:

receive a first target signaling and a second target signaling sent by the base station when in the connection state; in the embodiment, the first target signaling is a signaling for configuring measurement parameters for the unmanned aerial vehicle; the measurement parameters are parameters that the unmanned aerial vehicle needs to measure when performing a target measurement; the target measurement is a measurement of a cell handover according to a channel quality corresponding to multiple target cells, the multiple target cells include: a serving cell in which the unmanned aerial vehicle is currently located and at least one cell adjacent to the serving cell; the second target signaling is signaling for configuring the measurement reporting parameter for the unmanned aerial vehicle; the measurement reporting parameters are parameters respectively corresponding to the multiple target cells and included in the measurement report of the target measurement reported by the unmanned aerial vehicle;

Perform the target measurement according to the first target signaling to obtain the measurement parameters;

Report the measurement report including the measurement reporting parameters to the base station according to the second target signaling.

Figure 17:
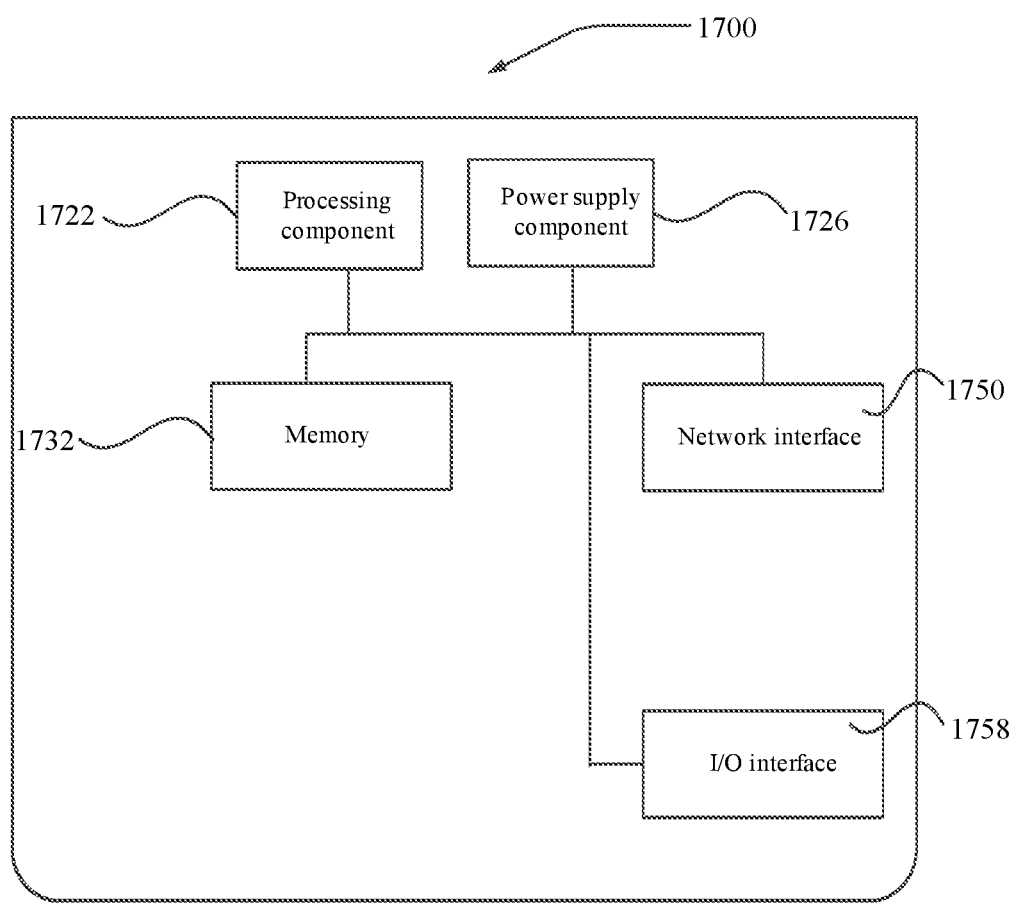
FIG. 17 is structure schematic diagram of another measurement reporting apparatus according to an exemplary embodiment of the present disclosure.

As shown in FIG. 17, FIG. 17 is a schematic structural diagram of a measurement reporting apparatus 1700 according to an exemplary embodiment. For example, the apparatus 1700 can be provided as an unmanned aerial vehicle. Referring to FIG. 17, apparatus 1700 includes a processing component 1722 that further includes one or more processors, and memory resources represented by memory 1732 for storing instructions executable by processing component 1722, such as an application. The application stored in memory 1732 may include one or more modules each corresponding to a set of instructions. Additionally, the processing component 1722 is configured to execute instructions to perform the above described measurement reporting method.

The apparatus 1700 may also include a power supply component 1726 configured to perform power management of apparatus 1700, a wired or wireless network interface 1750 configured to connect the apparatus 1700 to the network and an input/output (I/O) interface 1758. The apparatus 1700 may operate based on an operating system stored in the memory 1732, such as Windows Server™, Mac OS X™, Unix™, Linux™, FreeBSD™ or the like.

Those skilled in the art will readily think of other embodiments of the present disclosure after considering the specification and practicing the invention disclosed herein. The present disclosure is intended to cover any variations, uses or adaptation changes of the present disclosure, which are in accordance with the general principles of the present disclosure and include common general knowledge or conventional technical means in the art that are not disclosed in the present disclosure. The description and embodiments are to be regarded as illustrative only, the true scope and spirit of the disclosure is pointed out by the following claims.

It should be understood that the disclosure is not limited to the precise structures that have been described above and shown in the accompanying drawings, and various modifications and changes can be made without departing from the scope thereof. The scope of the invention is limited only by the appended claims.

The invention claimed is:

1. A measurement reporting method, applied to a base station, comprising:
configuring measurement parameters and measurement reporting parameters dedicated to an unmanned aerial vehicle for the unmanned aerial vehicle in a connection state in a first target signaling and a second target signaling; wherein the measurement parameters are parameters that the unmanned aerial vehicle needs to measure when performing a target measurement, and the target measurement is a measurement of a cell handover according to channel quality corresponding to multiple target cells, the multiple target cells comprise: a serving cell in which the unmanned aerial vehicle is currently located and at least one cell adjacent to a serving cell; the measurement reporting parameters are parameters respectively corresponding to the multiple target cells and included in a measurement report of a target measurement reported by the unmanned aerial vehicle;
sending the first target signaling and the second target signaling to the unmanned aerial vehicle, so that the unmanned aerial vehicle performs the target measurement according to the first target signaling; after obtaining the measurement parameters, the unmanned aerial vehicle selects a target number of the measurement parameters from the measurement parameters in descending order as the measurement reporting parameters, reporting the measurement report including the measurement reporting parameters to the base station according to the second target signaling;
configuring a number of target cells for the unmanned aerial vehicle in a fourth target signaling; in which the number of target cells is the maximum value of the total number of the multiple target cells; a number of the multiple target cells is 32;
sending the fourth target signaling to the unmanned aerial vehicle, so that the measurement report reported by the unmanned aerial vehicle includes the measurement reporting parameters respectively corresponding to cells of target number and the target number does not exceed the number of the target cells.

2. The method according to claim 1, wherein the first target signaling is triggerQuantity signaling and the second target signaling is reportQuantity signaling.

3. The method according to claim 1, wherein the measurement parameters comprise at least one of the following:
a reference signal received power RSRP, configured to characterize a downlink channel quality of a current cell;
a reference signal received quality RSRQ, configured to characterize the downlink channel quality of a current cell.

4. The method according to claim 3, wherein in a case that the measurement parameters include RSRP or RSRQ, the measurement reporting parameters are consistent with the measurement parameters;
in a case that the measurement parameters include RSRP and RSRQ, the measurement reporting parameters include at least one of RSRP and RSRQ.

5. The method according to claim 1, wherein the method further comprises:
configuring a smoothing coefficient corresponding to the measurement parameters for the unmanned aerial vehicle in a third target signaling; wherein the smoothing coefficient is a coefficient for smoothing filtering current measurement parameters;
sending the third target signaling to the unmanned aerial vehicle, so that the unmanned aerial vehicle performs smoothing filtering on the measured measurement parameters according to the smoothing coefficient, and discarding the measurement parameters that reach a preset threshold according to a smoothing filtering result.

6. The method according to claim 5, wherein the third target signaling is QuantityConfigEUTRA signaling.

7. The method according to claim 1, wherein the fourth target signaling is maxCellReport signaling.

8. A communication system implementing the method of claim 1, comprising the base station, wherein the base station is configured to:
respectively configure the measurement parameters and the measurement reporting parameters for the unmanned aerial vehicle in the connection state, to thereby enable the unmanned aerial vehicle to perform the target measurement and report the measurement report of the target measurement normally during flight, while ensuring accuracy and timeliness of the target measurement and reporting measurement report of the unmanned aerial vehicle;
configure number of the target cells for the unmanned aerial vehicle in a fourth target signaling; wherein the number of the target cells is a maximum value of a total number of the multiple target cells; and
send the fourth target signaling to the unmanned aerial vehicle, and the measurement report reported by the unmanned aerial vehicle includes measurement reporting parameters corresponding to the cells of target number respectively, thereby increasing the number of cells included in the measurement report reported by the unmanned aerial vehicle.

9. A measurement reporting method, applied to an unmanned aerial vehicle, comprising:
receiving a first target signaling and a second target signaling sent by a base station when the unmanned aerial vehicle is in a connection state; wherein the first target signaling is a signaling for configuring measurement parameters dedicated to an unmanned aerial vehicle for the unmanned aerial vehicle, the measurement parameters are parameters that the unmanned aerial vehicle needs to measure when performing a target measurement, the target measurement is a measurement of a cell handover according to a channel quality corresponding to multiple target cells, and the multiple target cells comprise: a serving cell in which the unmanned aerial vehicle is currently located and at least one cell adjacent to the serving cell; the second target signaling is a signaling for configuring the measurement reporting parameters for the unmanned aerial vehicle, the measurement reporting parameters are parameters respectively corresponding to the multiple target cells and included in the measurement report of the target measurement reported by the unmanned aerial vehicle;
performing the target measurement according to the first target signaling to obtain the measurement parameters, wherein after obtaining the measurement parameters, the unmanned aerial vehicle selects a target number of the measurement parameters from the measurement parameters in descending order as the measurement reporting parameters;

receiving a fourth target signaling sent by the base station, wherein the fourth target signaling is signaling for configuring a number of target cells for the unmanned aerial vehicle, and the number of target cells is a maximum value of a total number of the multiple target cells; a number of the multiple target cells is 32;

reporting the measurement report including the measurement reporting parameters to the base station according to the second target signaling;

in a case that the measurement parameters include RSRP or RSRQ, selecting a target number of the measurement parameters from the measurement parameters in descending order as the measurement reporting parameters, in which the target number does not exceed the number of target cells;

in a case that the measurement parameters include RSRP and RSRQ, selecting a target number of the measurement parameters in descending order as the measurement reporting parameters in at least one of RSRP and RSRQ.

10. The method according to claim 9, wherein the first target signaling is triggerQuantity signaling and the second target signaling is reportQuantity signaling.

11. The method according to claim 9, wherein the measurement parameters comprise at least one of the following:
a reference signal received power RSRP, configured to characterize a downlink channel quality of a current cell;
a reference signal received quality RSRQ, configured to characterize the downlink channel quality of the current cell.

12. The method according to claim 11, wherein in a case that the measurement parameters include RSRP or RSRQ, the measurement reporting parameters are consistent with the measurement parameters;
in a case that the measurement parameters include RSRP and RSRQ, the measurement reporting parameters include at least one of RSRP and RSRQ.

13. The method according to claim 9, wherein the method further comprises:
receiving a third target signaling sent by the base station, wherein the third target signaling is signaling for configuring a smoothing coefficient corresponding to the measurement parameters for the unmanned aerial vehicle and the smoothing coefficient is a coefficient for smoothing filtering the current measurement parameters;
smoothing filtering the measured measurement parameters according to the smoothing coefficient so as to obtain a smoothing filtering result;
discarding the measurement parameters that reach a preset threshold according to the smoothing filtering result.

14. The method according to claim 13, wherein the smoothing filtering the measured measurement parameters according to the smoothing coefficient to obtain a smoothing filtering result comprises:
calculating the smoothing coefficient and the measurement parameters according to a predefined smoothing filtering formula, and using the calculation result as a smoothing filtering result.

15. The method according to claim 13, wherein the third target signaling is QuantityConfigEUTRA signaling.

16. The method according to claim 9, wherein the method further comprises:
reporting a measurement report including the selected measurement reporting parameters to the base station.

17. The method according to claim 16, wherein the fourth target signaling is maxCellReport signaling.

18. A measurement reporting apparatus, applied in an unmanned aerial vehicle, comprising:
a processor;
a memory, configured to instructions executable by the processor;
wherein the processor is configured to:
receive a first target signaling and a second target signaling sent by a base station when the unmanned aerial vehicle is in a connection state; wherein the first target signaling is a signaling for configuring measurement parameters dedicated to an unmanned aerial vehicle for the unmanned aerial vehicle, the measurement parameters are parameters that the unmanned aerial vehicle needs to measure when performing a target measurement, the target measurement is a measurement of a cell handover according to channel quality corresponding to multiple target cells, and the multiple target cells comprise: a serving cell in which the unmanned aerial vehicle is currently located and at least one cell adjacent to the serving cell; the second target signaling is a signaling for configuring the measurement reporting parameters for the unmanned aerial vehicle, the measurement reporting parameters are parameters respectively corresponding to the multiple target cells and included in the measurement report of the target measurement reported by the unmanned aerial vehicle;
perform the target measurement according to the first target signaling to obtain the measurement parameters, after obtaining the measurement parameters, the unmanned aerial vehicle selects a target number of the measurement parameters from the measurement parameters in descending order as the measurement reporting parameters;
receive a fourth target signaling sent by the base station, wherein the fourth target signaling is signaling for configuring a number of target cells for the unmanned aerial vehicle, and the number of target cells is a maximum value of a total number of the multiple target cells; a number of the multiple target cells is 32;
report the measurement report including the measurement reporting parameters to the base station according to the second target signaling; which comprises:
in a case that the measurement parameters include RSRP or RSRQ, selecting a target number of the measurement parameters from the measurement parameters in descending order as the measurement reporting parameters, in which the target number does not exceed the number of target cells;
in a case that the measurement parameters include RSRP and RSRQ, selecting a target number of the measurement parameters in descending order as the measurement reporting parameters in at least one of RSRP and RSRQ.

19. The apparatus according to claim 18, wherein:
the first target signaling is triggerQuantity signaling and the second target signaling is reportQuantity signaling; and
the measurement parameters comprise at least one of:
a reference signal received power RSRP, configured to characterize a downlink channel quality of a current cell; or
a reference signal received quality RSRQ, configured to characterize the downlink channel quality of the current cell.

* * * * *